US012424779B2

(12) United States Patent
Chuah et al.

(10) Patent No.: US 12,424,779 B2
(45) Date of Patent: Sep. 23, 2025

(54) FLEXIBLE PRINTED CIRCUIT BOARD ARRANGEMENT

(71) Applicant: Intel Corporation, Santa Clara, CA (US)

(72) Inventors: Tin Poay Chuah, Pulau Pinang (MY); Jeff Ku, Taipei (TW); Yew San Lim, Pulau Pinang (MY); Boon Ping Koh, Pulau Pinang (MY); Min Suet Lim, Pulau Pinang (MY)

(73) Assignee: Intel Corporation, Santa Clara, CA (US)

( * ) Notice: Subject to any disclaimer, the term of this patent is extended or adjusted under 35 U.S.C. 154(b) by 830 days.

(21) Appl. No.: 17/500,983

(22) Filed: Oct. 14, 2021

(65) Prior Publication Data

US 2023/0123645 A1 Apr. 20, 2023

(51) Int. Cl.
*H01R 12/78* (2011.01)
*H01R 13/20* (2006.01)
(Continued)

(52) U.S. Cl.
CPC ............. *H01R 12/78* (2013.01); *H01R 13/20* (2013.01); *H01R 13/28* (2013.01); *H01R 13/62983* (2013.01); *H01R 43/0256* (2013.01)

(58) Field of Classification Search
CPC ........ H01R 12/78; H01R 13/20; H01R 13/28; H01R 13/62983; H01R 43/0256; H01R 12/61
See application file for complete search history.

(56) References Cited

U.S. PATENT DOCUMENTS 4,931,021 A * 6/1990 Mohan .................. H01R 13/28 439/284
4,981,336 A * 1/1991 Mohan .................. H01R 13/28 385/56

(Continued)

FOREIGN PATENT DOCUMENTS

GB 2378054 A * 1/2003 ............. A44B 19/00
GB 2598337 A * 3/2022 ............. A44B 19/02
TW 201110903 A * 4/2011 ........... A44B 19/262

OTHER PUBLICATIONS

Machine Translation TW 201110903 A, (Apr. 1, 2011) (Year: 2025).*

*Primary Examiner* — Travis S Chambers
(74) *Attorney, Agent, or Firm* — Viering, Jentschura & Partner mbB

(57) ABSTRACT

There may be provided a fastener arrangement. The fastener arrangement may include a first fastener tape including a first plurality of electrically conductive coupling elements and a first plurality of non-electrically conductive coupling elements. The fastener arrangement may further include a second fastener tape comprising a second plurality of electrically conductive coupling elements and a second plurality of non-electrically conductive coupling element. The fastener arrangement may further include a slider couplable to the first fastener tape and the second fastener tape for reversibly interleaving and interlocking the first plurality of electrically conductive and non-electrically conductive coupling elements with their corresponding second plurality of electrically conductive and non-electrically conductive elements. The interleaved and interlocked first and second plurality of electrically conductive coupling elements may form a plurality of conductive-bridges and the interleaved and interlocked first and second plurality of non-electrically conductive coupling elements may form a plurality of insulation-bridges.

20 Claims, 11 Drawing Sheets

(51) Int. Cl.
*H01R 13/28* (2006.01)
*H01R 13/629* (2006.01)
*H01R 43/02* (2006.01)

(56) References Cited

U.S. PATENT DOCUMENTS

| | | | | | |
|---|---|---|---|---|---|
| 5,499,927 | A * | 3/1996 | Ohno | H01R 12/777 29/408 |
| 6,805,568 | B2 * | 10/2004 | Kuzmenka | H01R 12/78 439/714 |
| 9,231,327 | B1 * | 1/2016 | Liu | H01B 7/06 |
| 9,854,880 | B2 * | 1/2018 | Kojima | A44B 19/04 |
| 2004/0018763 | A1 * | 1/2004 | Kuzmenka | H01R 12/89 439/285 |
| 2009/0203244 | A1 * | 8/2009 | Den Toonder | H01R 13/28 439/285 |
| 2010/0136804 | A1 * | 6/2010 | Strickland | H01R 12/774 439/65 |
| 2023/0309663 | A1 * | 10/2023 | Annaka | A44B 19/32 24/389 |

* cited by examiner

Section A-A

Section B-B

FLEXIBLE PRINTED CIRCUIT BOARD ARRANGEMENT

TECHNICAL FIELD

The various aspects of the present disclosure generally relate to a fastener arrangement, a flexible printed circuit board arrangement, and a method of assembling the flexible printed circuit board arrangement. In particular, the various aspects generally relate to a fastener arrangement, a flexible printed circuit board arrangement, and a method of assembling the flexible printed circuit board arrangement, for reversibly connecting at least two electronic boards (e.g., flexible printed circuits boards).

BACKGROUND

Most computer systems (e.g., laptops) generally employ approximately 10 to 15 cable assemblies. The cable routing paths, as well as connector placement of cable assemblies, contribute to a major design challenge of such computer systems. A cable connector needs to be located at an easily accessible location for cable plug-in after board assembly is completed. This generally limits the positioning of the cable connectors to an edge and/or top side (e.g., distal side) (in other words, peripheral edges/sides) of the computer system. Consequently, cable routing paths may be long and/or winding, while providing few options for positioning cable connectors. On the other hand, poor placement of the cable connectors may result in the computer system being more difficult and time-consuming to assemble.

Conventional flexible printed circuits (FPCs) (e.g., flex printed circuit board (PCB), rigid-flex PCB, etc.) have been widely used (e.g., in the computing industry) to interconnect one board (e.g., electronic board, PCB) to another board (e.g., electronic board, PCB). Examples of such "board-to-board" interconnection include connection of a motherboard to a display board, a motherboard to a Universal Serial Bus/Thunderbolt Input/Output board, etc.

In general, FPCs may be assembled or connected to another module (e.g., another board) via onboard receptacles, on-Flex/FPC headers, Flex/FPC cables, etc. However, the mating force required to hold the interconnect pins of the FPCs to a corresponding module creates a limit (or cap) on a total (or maximum) pin count permissible on each FPC/module. For example, a 30 Newton (N) force may be required to hold down a 56 pins FPC connector to a corresponding module. Thus, for example, in order to regulate the mating force to be within or below 50 N, a connector manufacturer may set a limit on a total pin count for a FPC/module to be 80 pins. By the same token, to interconnect 162 signal/power pins, 3 pieces of FPC modules may be required. However, these generally result in high bill of materials (BOM) cost and may also pose challenges to the design and assembly of a computer system.

Mounting screws or retention screws have generally been used to support or aid in securing interconnect pins of a FPC to a corresponding module. However, mounting screws and corresponding holes for receiving the screws tend to enlarge a keep-out-zone, thereby leading to a larger board area being required.

While conventional rigid-flex PCBs may be employed to interconnect two boards/modules/sub-systems, the cost of conventional rigid-flex PCBs may be high. Moreover, conventional rigid-flex PCBs do not provide flexibility in detaching or unplugging one board (e.g., a sub-system module) from another interconnected board (e.g., a main motherboard).

Accordingly, there is a need to develop a fastener arrangement, a flexible printed circuit board arrangement, and a method of assembling the flexible printed circuit board arrangement, for reversibly coupling at least two distinct electronic boards together, said fastener arrangement may be positioned (or installed) at a number of locations within a system (e.g., computer system) without being limited or constrained to only the peripheral edges/sides of the system, and said fastener arrangement may be is easy and generally low-cost to produce, to thereby address the above-mentioned issues.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects are described with reference to the following drawings, in which.

DETAILED DESCRIPTION

Figure 1A:
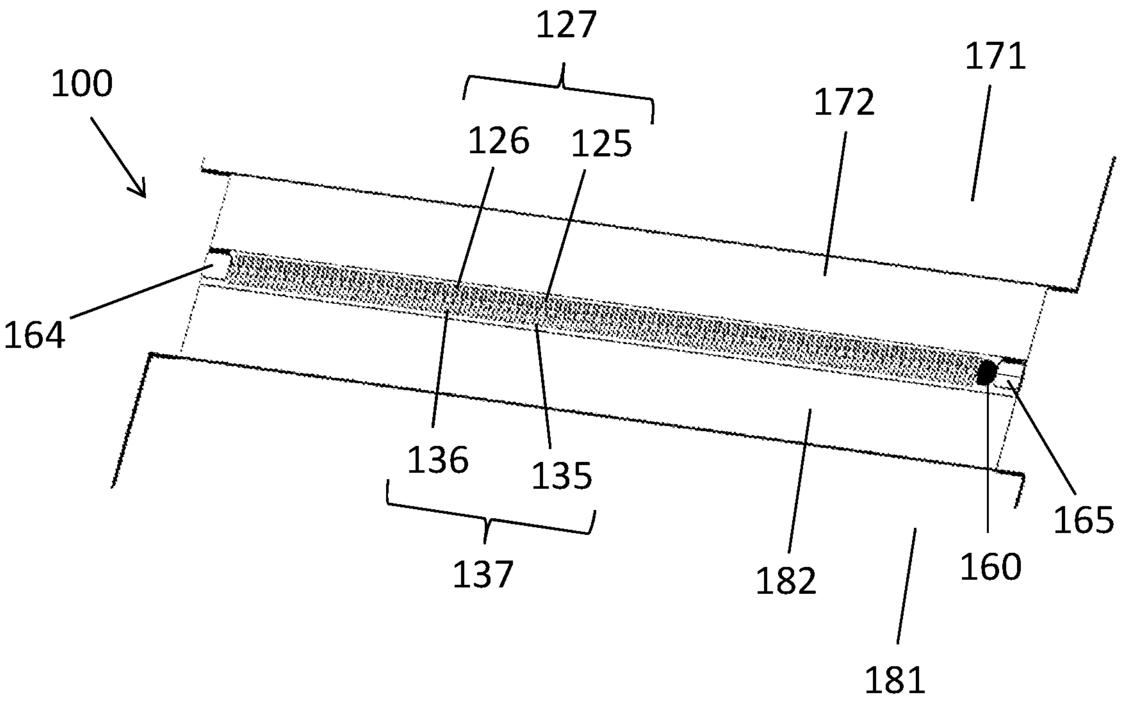
FIG. 1A shows a perspective view of a fastener arrangement, according to an aspect of the present disclosure.

It will be understood that the aspects described below may be combined, for example, a part of one aspect may be combined with a part of another aspect. Further, aspects/description below in the context of the apparatus/device are analogously valid for the respective method, and vice versa.

It should be understood that the terms “on”, “over”, “top”, “bottom”, “down”, “side”, “back”, “left”, “right”, “front”, “lateral”, “side”, “up”, “down”, etc., when used in the following description are used for convenience and to aid understanding of relative positions or directions, and not intended to limit the orientation of any device, or structure or any part of any device or structure. In addition, the singular terms “a”, “an”, and “the” include plural references unless context clearly indicates otherwise. Similarly, the word “or” is intended to include “and” unless the context clearly indicates otherwise.

Various aspects of the present disclosure generally relate to a fastener arrangement (e.g., zip fastener arrangement which may include a zipper mechanism or electrical connector arrangement which may include an electrical connector) for reversibly coupling a first board (e.g., main board, which may be or include, for example, an electronic board, FPC, flex PCB, rigid-flex PCB, etc.) to another board (e.g., sub-board/module, which may be or include, for example, an electronic board, FPC, flex PCB, rigid-flex PCB, etc.) while enabling the first board to electrically communicate with the other board via the fastener arrangement (e.g., via the zipper mechanism or the electrical connector).

In an aspect, the fastener arrangement may include a first fastener tape (e.g., stiffener, stringer etc., which may be flexible) with a first plurality of electrically conductive and non-electrically conductive coupling elements (e.g., zipper teeth, pins, etc.) disposed or arranged in a series and/or in an alternating manner along a corresponding longitudinal edge of the first fastener tape. The first fastener tape may be attached or secured to a first board (e.g., to a flexible cable of or for the board which may be, for example, a flexible flat cable) with the electrically conductive coupling elements of the first fastener tape being electrically connected to the first board (e.g., to or via the flexible cable of the board). The fastener arrangement may further include a second fastener tape (e.g., stiffener, stringer etc., which may be flexible) with a second plurality of electrically conductive and non-electrically conductive coupling elements (e.g., zipper teeth, pins, etc.) disposed or arranged in a series and/or in an alternating manner along a corresponding longitudinal edge of the second fastener tape. The second fastener tape may be attached or secured to a second board (e.g., to a flexible cable of or for the board) with the electrically conductive coupling elements of the second fastener tape being electrically connected to the second board (e.g., to or via the flexible cable of the board).

In an aspect, the fastener arrangement may be provided with a slider (e.g., zipper slider, zipper head, joining device, etc.). The slider may be capable of moving (e.g., linearly, up or down) along the corresponding longitudinal edges of the first and the second fastener tapes, said movement causing the coupling elements of the first and the second fastener tapes to mutually engage to zip (or close) the fastener arrangement such that the electrically conductive coupling elements of the first fastener tape may be in contact or engagement or connection with the electrically conductive coupling elements of the second fastener tape (so as to form an electrically conductive path or route therebetween) or to mutually disengage in order to unzip (or open) the fastener arrangement.

Accordingly, with the fastener arrangement, according to various aspects, the use of mounting/retention screws for holding two boards together may not be required.

Moreover, various aspects may provide a fastener arrangement capable of reversibly coupling at least two boards (e.g., distinct and/or separate electronic boards) together, without compression forces (i.e., associated with mating connectors) between the at least two interconnected boards.

Further, with the fastener arrangement according to various aspects, a highly reliable pin(s)-to-pin(s) (e.g., electrically conductive tooth/teeth-to-tooth/teeth) contact and a strong connection or joint may be formed (i.e., when the coupling elements of the first and the second fastener tapes are mutually engaged and interlocked), without a need for any additional locking mechanism or system to prevent the mutually engaged and interlocked coupling elements from becoming loose and uncoupling.

Since the fastener arrangement according to various aspects may eliminate a need for complex mating or locking mechanisms/systems, BOM cost may also be lowered or minimized.

According to various aspects, the fastener arrangement may be attached or secured or bonded to a flexible cable (e.g., of a FPC, board, module, etc.) at any location along a length of the flexible cable. In other words, the fastener arrangement may be positioned anywhere along a cable routing path of a system (e.g., computer system). Accordingly, it may be possible to position the fastener arrangement at a number of easily accessible locations (e.g., to a technician) within a computer system, which may lead to reduced assembly time of the computer system.

Various aspects of the fastener arrangement may also eliminate pin count limits typically associated with compression forces between interconnected cables or boards of conventional systems. In other words, the conventional limit on total pin count (i.e., associated with compression forces between interconnected cables/boards) per interconnect cable (e.g., flexible cable of a FPC, board, module, etc.) may be eliminated by having the fastener arrangement according to various aspects electronically couple at least two cables (i.e., flexible cables of the FPC, board, module, etc.) together. Accordingly, the fastener arrangement may include any number of coupling elements (e.g., pins) and may be limited only by a total width or length of the interconnect cable. Thus, according to an aspect of the present disclosure, a number of coupling elements (e.g., pins) of the fastener arrangement may span an entire (e.g., substantially an entire) width or length of the interconnect cable.

Figure 1B:
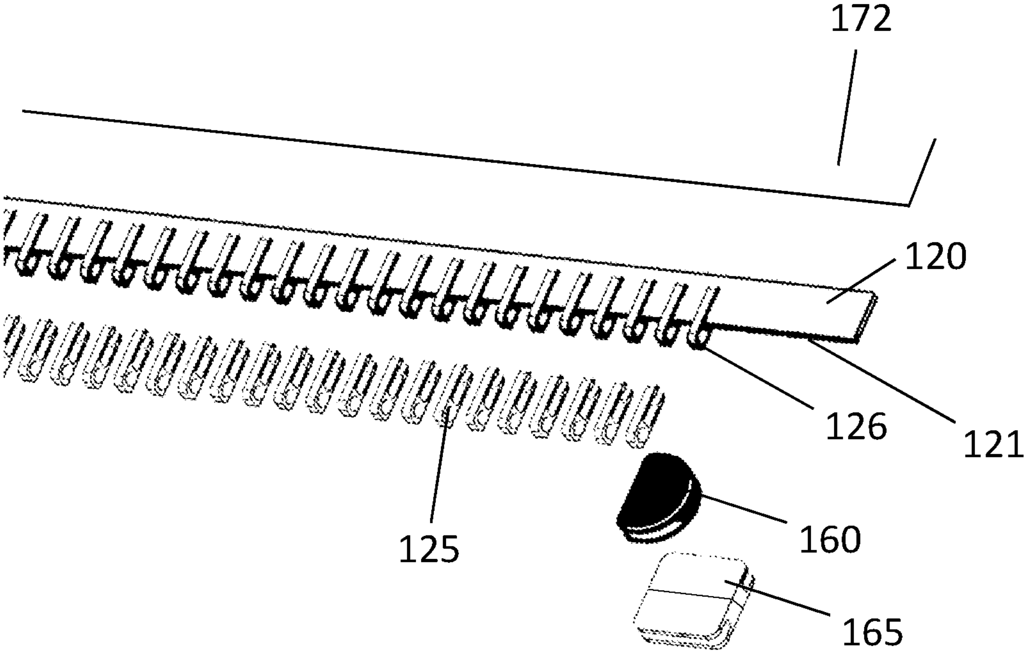
FIG. 1B shows, among other features, a partially exploded view of a first fastener tape, first paired coupling elements, a slider, and an end stop, of the fastener arrangement of FIG. 1A, according to an aspect of the present disclosure.

FIG. 1A shows a perspective view of a fastener arrangement 100, according to an aspect of the present disclosure; FIG. 1B shows, among other features, a partially exploded view of a first fastener tape 120, first paired coupling elements 127, a slider 160, and an end stop 165, of the fastener arrangement 100 of FIG. 1A, according to an aspect of the present disclosure; and FIG. 1C shows a magnified view of, among other features, interleaved and interlocked first and second paired coupling elements 127 and 137 of the fastener arrangement 100 of FIG. 1A, according to an aspect of the present disclosure.

Figure 1C:
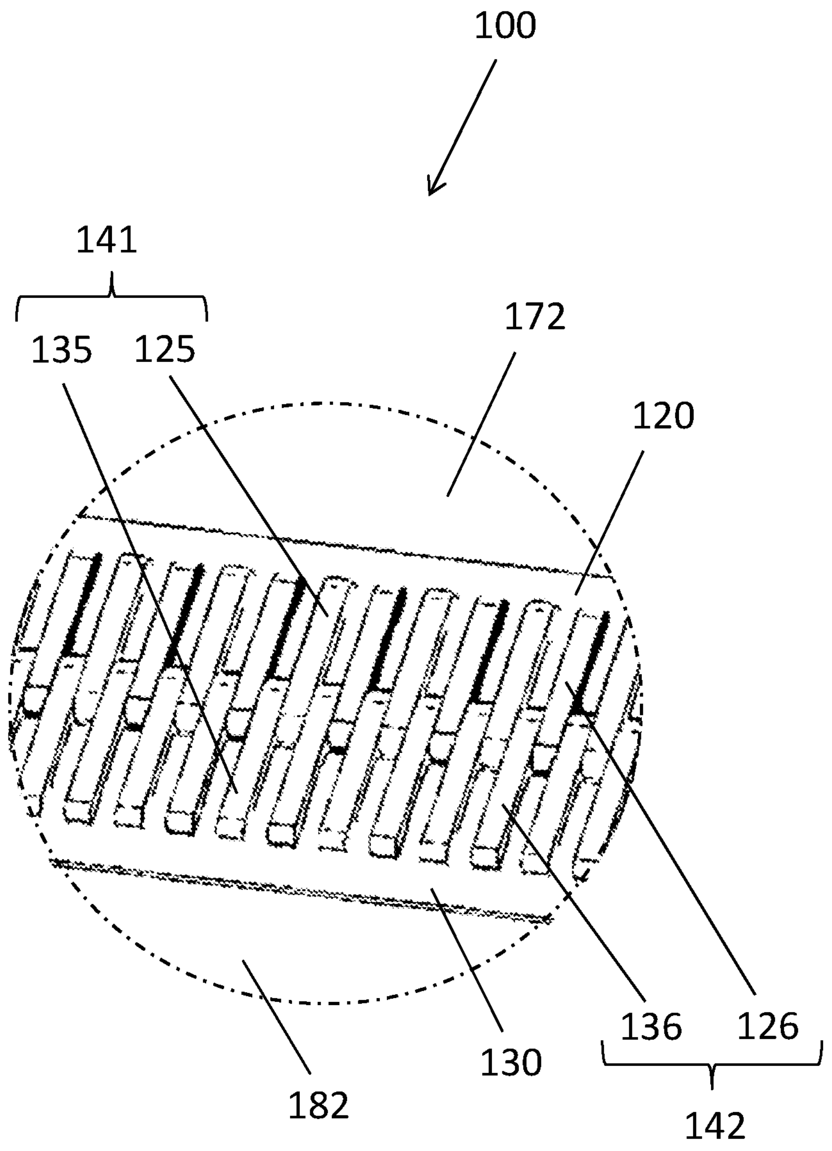
FIG. 1C shows, among other features, a magnified view of interleaved and interlocked first and second paired coupling elements of the fastener arrangement of FIG. 1A, according to an aspect of the present disclosure.

According to the various aspects of the present disclosure, as shown in FIG. 1A to FIG. 1C, the fastener arrangement 100 may include the first fastener tape 120 (e.g., a first stiffener). The first fastener tape 120 may be configured to provide support (e.g., mechanical support) to or for a first plurality of electrically conductive coupling elements 125 (e.g., electrically conductive pins, electrically conductive zipper teeth, etc.) and a first plurality of non-electrically conductive coupling elements 126 (e.g., insulative pins, insulative zipper teeth etc.).

Further, the fastener arrangement 100 may include a second fastener tape 130 (e.g., a second stiffener). The second fastener tape 130 may be configured to provide support (e.g., mechanical support) to or for a second plurality of electrically conductive coupling elements 135 (e.g., electrically conductive pins, electrically conductive zipper teeth, etc.) and a second plurality of non-electrically conductive coupling elements 136 (e.g., insulative pins, insulative zipper teeth etc.).

In an aspect, each of the first and the second fastener tapes 120 and 130 may be non-electrically conductive and/or may function as a ground for a circuit. For example, each of the first and the second fastener tapes 120 and 130 may be made of or may include silicon rubber, polyoxymethylene (POM), liquid crystal polymer (LCP), a reversibly deformable non-electrically conductive material, a textile/fabric, any plastic or polymer material, having good lubrication properties/characteristics (e.g., for enabling a slider 160 or zipper head to glide over with minimal resistance, etc.).

The first fastener tape 120 may include the first plurality of electrically conductive coupling elements 125 and the first plurality of non-electrically conductive coupling elements 126 (herein collectively referred to as "first paired coupling elements 127"), disposed and/or arranged along a longitudinal edge 121 of the first fastener tape 120.

Further, the second fastener tape 130 may include the second plurality of electrically conductive coupling elements 135 and the second plurality of non-electrically conductive coupling elements 136 (herein collectively referred to as "second paired coupling elements 137"), disposed and/or arranged along a longitudinal edge 131 (see FIG. 1G) of the second fastener tape 130.

In an aspect, the first plurality of electrically conductive coupling elements 125 may be identical in composition and similar in form (e.g., being symmetrical or a mirror image about a central longitudinal axis of the fastener arrangement) with the second plurality of electrically conductive coupling elements 135.

In an aspect, each of the first and the second pluralities of electrically conductive coupling elements 125 and 135 may be made of or may include a metal or alloy (e.g., copper, nickel-gold, a malleable metal or alloy, etc.), or any suitable electrically conductive material.

For example, the first and the second pluralities of electrically conductive coupling elements 125 and 135 may be made entirely of an electrically conductive metal or material.

As another example, the first and the second pluralities of electrically conductive coupling elements 125 and 135 may include an electrically conductive coating over an electrically conductive or non-electrically conductive core or inner structure. A material for the electrically conductive coating may be selected based on improving properties (e.g., electrical conductivity, reliability, durability, etc.) of the electrically conductive coupling elements 125 and 135.

In an aspect, the first plurality of non-electrically conductive coupling elements 126 may be identical in composition and similar in form with the second plurality of non-electrically conductive coupling elements 136.

For example, the first and the second pluralities of non-electrically conductive coupling elements 126 and 136 may be made of or may include any non-electrically conductive or insulative material (e.g., POM, LCP, any suitable plastic/polymer, etc).

As another example, each of the first and the second pluralities of non-electrically conductive coupling elements 126 and 136 may be made entirely of a non-electrically conductive or insulative material (e.g., electrical insulation).

As yet another example, each of the first and the second pluralities of non-electrically conductive coupling elements 126 and 136 may include a hard-anodized coating (e.g., Aluminium Oxide coating) over an electrically conductive core or inner structure.

According to an aspect of the present disclosure, each coupling element of the first paired coupling elements 127 and the second paired coupling elements 137 may be or may include (or may have a form similar or identical to) a tooth for a zip fastener. For example, each of the first paired coupling elements 127 and the second paired coupling elements 137 may be a plurality of substantially rigid projections (e.g., zip fastener teeth) arrayed (e.g., in a series) along a respective fastener tape and/or a corresponding cord (not shown) of the respective fastener tape. Each rigid projection (e.g., zip fastener tooth) may include a surface geometry (e.g., protruding element or recess) for mechanical interlocking with a mating surface geometry (e.g., recess or protruding element) of two adjacent projections of the two fastener tapes.

Figure 1D:
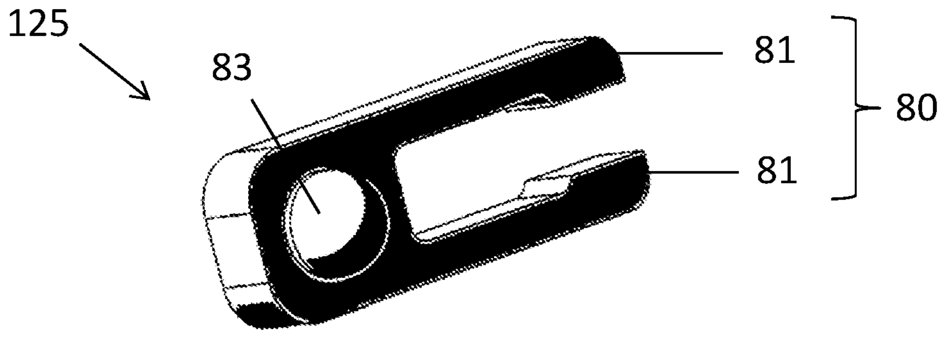
FIG. 1D shows a perspective view from a first orientation of an electrically conductive coupling element of the first plurality of electrically conductive coupling elements, according to an aspect of the present disclosure.
Figure 1E:
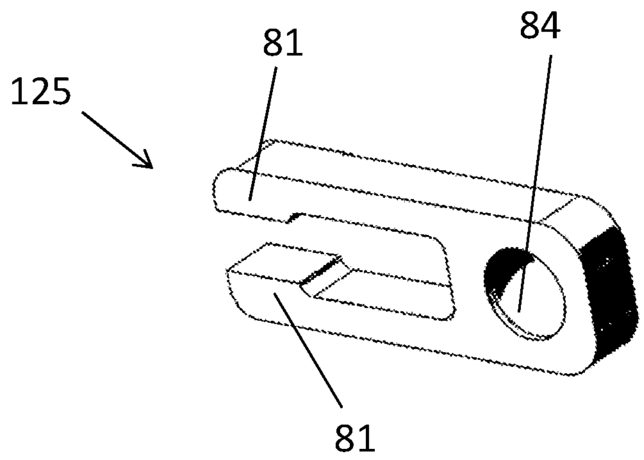
FIG. 1E shows a perspective view from a second orientation of the electrically conductive coupling element of FIG. 1D, according to an aspect of the present disclosure.

FIG. 1D shows a perspective view from a first orientation of an electrically conductive coupling element of the first plurality of electrically conductive coupling elements 125, according to an aspect of the present disclosure; and FIG. 1E shows a perspective view from a second orientation of the electrically conductive coupling element 125 of FIG. 1D, according to an aspect of the present disclosure.

The description of the parts/features made with respect to the electrically conductive coupling element 125 as shown in FIG. 1D and FIG. 1E may also be applicable to the first plurality of non-electrically conductive coupling elements 126, the second plurality of electrically conductive coupling element 135, and/or the second of non-electrically conductive coupling elements 136.

For example, in an aspect, the coupling element 125 may include a protruding element 83 (e.g., convex member, rounded protrusion, hemisphere-shaped protrusion) extending from one side or surface of the coupling element 125 and a recess 84 (e.g., concave/cavity, rounded recess, hemisphere-shaped recess) on an opposite side or surface of the coupling element 125 (as shown in FIG. 1D). The recess 84 may be shaped to receive or mate with the protruding element 83. Further, as shown, the coupling element 125 may include a jaw 80 (e.g., a malleable "U"-shaped clamp or bracket) configured to or for clamping a respective fastener tape (e.g., a cord of the fastener tape) and a flexible cable (e.g., flexible flat cable) therebetween (described later with respect to FIG. 1G and FIG. 1H).

In an aspect, the first paired coupling elements 127 and the second paired coupling elements 137 may be arranged in staggered (e.g., zig-zag) relation on opposing first and second fastener tapes 120 and 130 (as shown in FIG. 1A and FIG. 1C).

The fastener arrangement 100 may further include a slider 160. The slider 160 may be similar to a slider used for a zip fastener. Accordingly, as an example, the slider 160 may be a moveable element which may include a pair of channels (not shown) configured to or for directing the first and the second staggered and non-interlocked coupling elements through a curved coupling path (e.g., "Y"-shaped path) of the slider 160 and into a parallel (e.g., substantially parallel) interleaved and interlocked relationship. In operation, the slider 160 may be couplable to the first fastener tape 120 and the second fastener tape 130 to reversibly interleave and interlock the first paired coupling elements 127 with the second paired coupling elements 137. Movement of the slider 160 along a first or a second longitudinal direction of the fastener arrangement 100 may reversibly couple (i.e., reversibly interleave and interlock) or decouple the first plurality of electrically conductive and non-electrically conductive coupling elements 125 and 126 with their corresponding second plurality of electrically conductive and non-electrically conductive coupling elements coupling elements 135 and 136.

The fastener arrangement 100 may further include a first end stop 164 (e.g., a bottom-end stop) and a second end stop 165 (e.g., which may include a pair of top-end stops) at respective longitudinal ends or longitudinal end regions of the first fastener tape 120 and the second fastener tape 130. The first end stop 164 and the second end stop 165 may be configured to prevent the slider 160 from moving past a first longitudinal end (e.g., a bottommost position or start) and a second longitudinal end (e.g., an upmost position or end) of the first and the second fastener tapes 120 and 130. Each of the first end stop 164 and the second end stop 165 may be or may include any suitable end stop for a zip fastener. Thus, for example, the first end stop 164 may be a single integral piece configured to couple or grip or hold both the first fastener tape 120 and the second fastener tape 130 at the first longitudinal end of the first and the second fastener tapes 120 and 130, while the second end stop 165 may be composed of two pieces which may be provided at the second longitudinal end of the first fastener tape 120 and the second fastener tape 130 respectively.

Figure 1F:
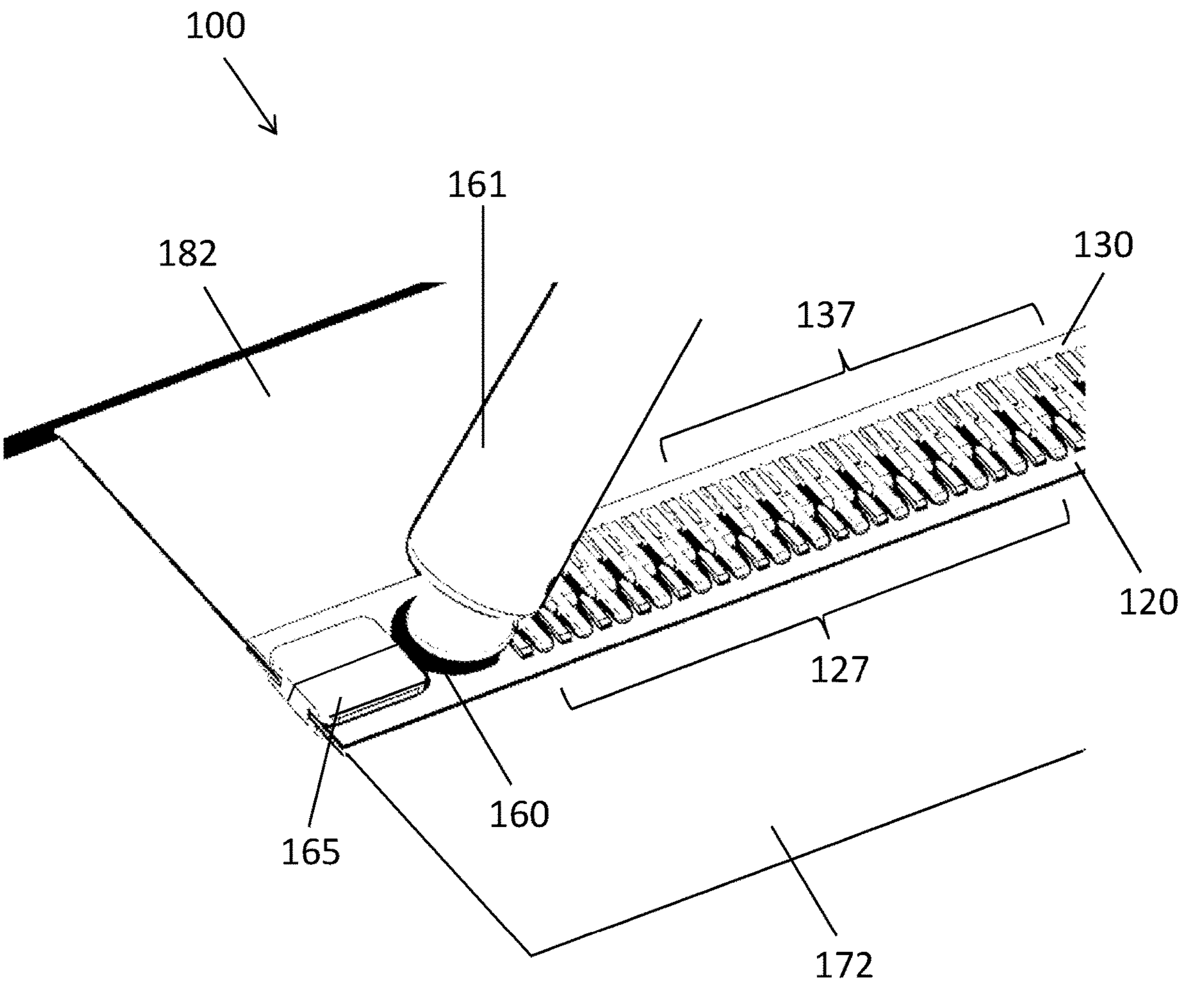
FIG. 1F shows a perspective view of an extension member for the slider of the fastener arrangement, according to an aspect of the present disclosure.

FIG. 1F shows a perspective view of an extension member 161 for the slider 160 of the fastener arrangement 100, according to an aspect of the present disclosure.

The fastener arrangement 100 may further include the extension member 161 configured to be attachable or detachably attached or secured to the slider 160. In an aspect, the extension member 161 may be detachably attached to the slider 160 by any suitable means, for example, via an adhesive, a magnetic attachment, or a mechanical fastener (e.g., screw and screw thread, latch, catch, snap fastener, snap fitting, cable and anchor, or hook). Accordingly, in use, the extension member 161 may be attached to an exposed surface (e.g., upper surface) of the slider 160 to serve as an extension arm for moving or sliding the slider 160 along the first and the second fastener tapes 120 and 130 to close (e.g., zip) or to open (e.g., unzip) the fastener arrangement 100.

In an aspect, the extension member 161 may include or may be, for example, a tab, a pole, a beam, a rod, a rope, etc. In an aspect, the extension arm may be rigid or, alternatively, may be flexible.

According to an aspect of the present disclosure, each of the first paired coupling elements 127 and the second paired coupling elements 137 of the fastener arrangement 100 may be arranged along corresponding longitudinal edges 121 and 131 of the first and the second fastener tapes 130, respectively, in a manner such that, when the first paired coupling elements 127 and the second paired coupling elements 137 are interleaved and interlocked with each other, each of the first plurality of electrically conductive coupling elements 125 may be mated or in contact or connected with a corresponding only one, or, alternatively, more than one (e.g., two), of the second plurality of electrically conductive coupling elements 135 to form a respective conductive-bridge 141. Further, each of the first plurality of non-electrically conductive coupling elements 126 may be mated or in contact or connected with a corresponding only one, or, alternatively, more than one (e.g., two), of the second plurality of non-electrically conductive coupling elements 136 to form a respective insulation-bridge 142. Accordingly, in an aspect, the interleaved and interlocked first and second plurality of electrically conductive coupling elements 125 and 135 may form at least one or a plurality of conductive-bridge(s) 141 and the interleaved and interlocked first and second plurality of non-electrically conductive coupling elements 126 and 136 may form at least one or a plurality of insulation-bridge(s) 142.

In an aspect, each conductive-bridge 141 may include a first number of electrically conductive coupling elements 125 and 135 of or from among both the first paired coupling elements 127 and the second paired coupling elements 137.

In an aspect, each insulation-bridge 142 may include a second number of non-electrically conductive coupling elements 126 and 136 of or from among both the first paired coupling elements 127 and the second paired coupling elements 137.

In an aspect, the first number of electrically conductive coupling elements 125 and 135 forming each conductive-bridge 141 may be equal to the second number of non-electrically conductive coupling elements 126 and 136 forming each insulation-bridge 142.

In another aspect, the first number of electrically conductive coupling elements 125 and 135 forming each conductive-bridge 141 may be different from the second number of non-electrically conductive coupling elements 126 and 136 forming each insulation-bridge 142.

For convenience of illustration and discussion, each conductive-bridge 141 may be described below as including only one electrically conductive coupling element 125 of the first plurality of electrically conductive coupling elements 125 and, additionally, only one electrically conductive coupling element 135 of the second plurality of electrically conductive coupling elements 135. In other words, the first number may be two. Further, each insulation-bridge 142 may be described below as including only one non-electrically conductive coupling element 126 of the first plurality of non-electrically conductive coupling elements 126 and, additionally, only one non-electrically conductive coupling element 136 of the second plurality of non-electrically conductive coupling elements 136. In other words, the second number may be two. However, those skilled in the art will readily observe that the first number and the second number are not limited to being two, and may be, for example, three, or four, or five, etc.

The fastener arrangement 100 may be configured to form (in other words include) at least one (in other words, one or more) conductive-bridge 141 and at least one insulation-bridge 142.

In an aspect, the fastener arrangement 100 may be configured to form an equal number of conductive-bridge(s) 141 and insulation-bridge(s) 142.

In another aspect, the fastener arrangement 100 may be configured to form a larger number of insulation-bridges 142 than conductive-bridge(s) 141.

In an aspect, the fastener arrangement 100 may form or may include at least one insulation-bridge 142 or at least one non-electrically conductive coupling element 126 or 136 immediately adjacent to the first end stop 164 and/or form or include at least one (e.g., other) insulation-bridge 142 or at least one (e.g., other) non-electrically conductive coupling element 126 or 136 immediately adjacent to the second end stop 165.

In an aspect, the at least one conductive-bridge 141 and the at least one insulation-bridge 142 of the fastener arrangement 100 may be in an alternating arrangement with respect to each other. In other words, interleaved and interlocked first and the second plurality of electrically conductive coupling elements 125 and 135 and interleaved and interlocked first and second plurality of non-electrically conductive coupling elements 126 and 136 of the fastener arrangement 100 may form an alternating arrangement of conductive-bridge(s) 141 and insulation-bridge(s) 142. For example, in an aspect, each conductive-bridge 141 may be positioned between (in other words, sandwiched between) two neighbouring (in other words, adjacent or immediately adjacent) insulation-bridges 142. Additionally or alternatively, in an aspect, each insulation-bridge 142 may be positioned between two neighbouring conductive-bridges 141.

Herein, reference to two or a pair of neighbouring conductive-bridges 141 may be defined as two conductive-bridges 141 without any other conductive-bridge(s) 141 therebetween (or separating) the two or pair of conductive-bridges 141. Further, reference to two or a pair of neighbouring insulation-bridges 142 may be defined as two insulation-bridges 142 without any other insulation-bridge(s) 142 therebetween (or separating) the two or pair of insulation-bridges 142.

In an aspect, at least two neighbouring insulation-bridges 142 may be in contact with each other.

In an aspect, at least two contacting neighbouring insulation-bridges 142 may be positioned between or sandwiched between two neighbouring conductive-bridges 141. In other words, when the first paired coupling elements 127 and the second paired coupling elements 137 are interleaved and interlocked with each other, at least two non-electrically conductive coupling elements 126 of the first plurality of non-electrically conductive coupling elements 126 and at least two non-electrically conductive coupling elements 136 of the second plurality of non-electrically conductive coupling elements 136 may be sandwiched between a pair of neighbouring conductive-bridges 141.

In an aspect, the conductive-bridges 141 may be separated by at least one insulation-bridge 142. In other words, in an aspect, the conductive-bridges 141 may be separated from one another, with at least one insulation-bridge 142 positioned therebetween each pair of neighbouring conductive-bridges 141. Accordingly, each insulation-bridge 142 may serve to isolate a corresponding pair of neighbouring conductive-bridges 141 from each another so as to prevent cross-talk between the pair of neighbouring conductive-bridges 141, such as when a signal (e.g., electric signal), a voltage, current, etc., travels or is passed through the pair of neighbouring conductive-bridges 141.

Figure 1G:
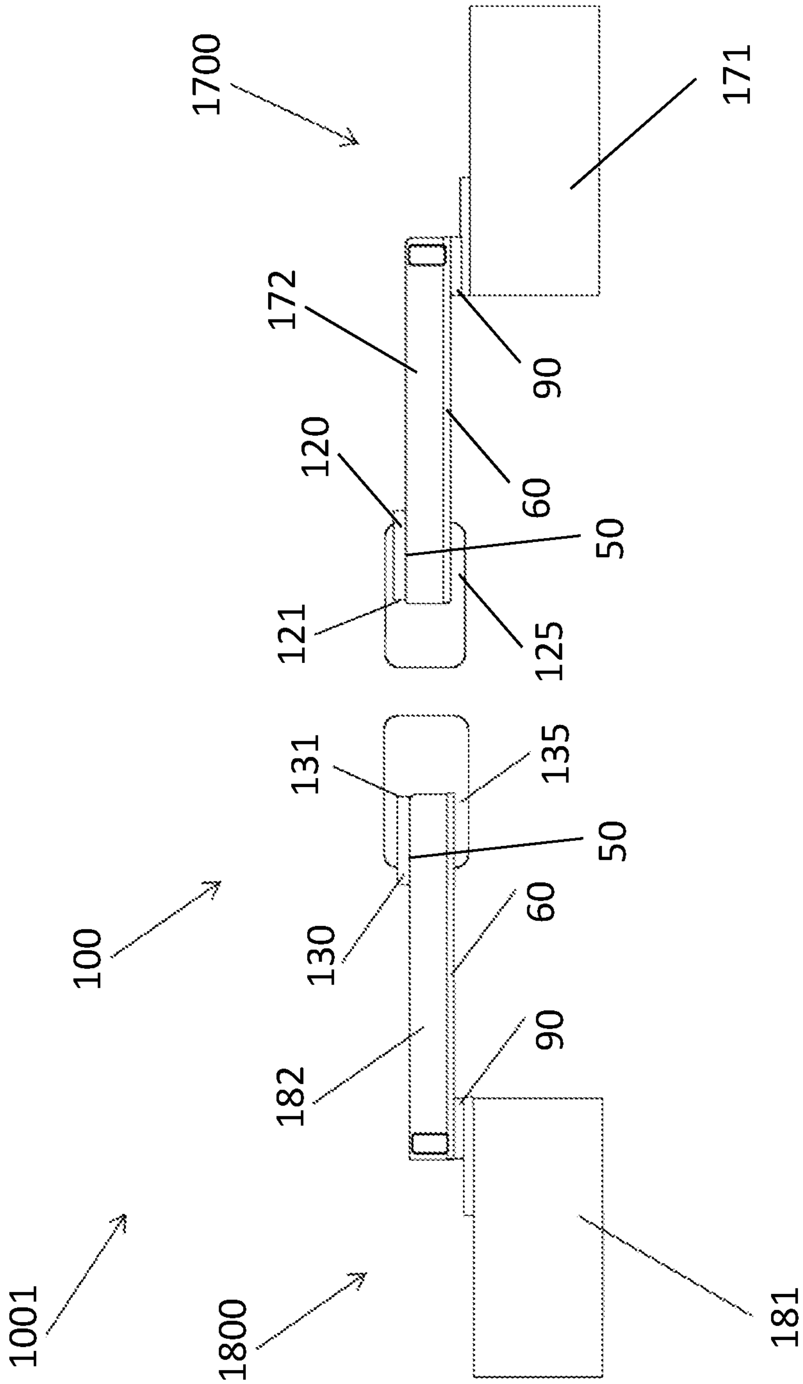
FIG. 1G shows a schematic side view of the fastener arrangement connected to a first electronic board via a first flexible cable and to a second electronic board via a second flexible cable, according to an aspect of the present disclosure.

FIG. 1G shows a schematic side view of the fastener arrangement 100 connected to a first electronic board 171 via a first flexible cable 172 and to a second electronic board 181 via a second flexible cable 182, according to an aspect of the present disclosure.

In an aspect, the first fastener tape 120 may include a corresponding securing element 50 (as shown in FIG. 1G) configured to or for securing the first fastener tape 120 to the first electronic board 171 (e.g., to a FPC, or to the flexible cable 172 of or for the board 171).

Further, the second fastener tape 130 may include a corresponding securing element 50 configured to or for securing the second fastener tape 130 to the second electronic board 181 (e.g., to a FPC, or to the flexible cable 182 of or for the board 181).

In an aspect, the securing element 50 may include, but is not limited to, an adhesive, a magnetic or ferromagnetic element, a mechanical fastener, etc.

In an aspect, the fastener arrangement 100 may include at least two electronic boards 171 and 181. Each electronic board 171 and 181 may include the corresponding flexible cable 172 or 182 (i.e., for the fastener arrangement 100 to be attached thereto) and/or may be or may include a FPC, flex PCB, rigid-flex PCB, PCB (e.g., rigid PCB with flexible cable), etc.

Figure 1H:
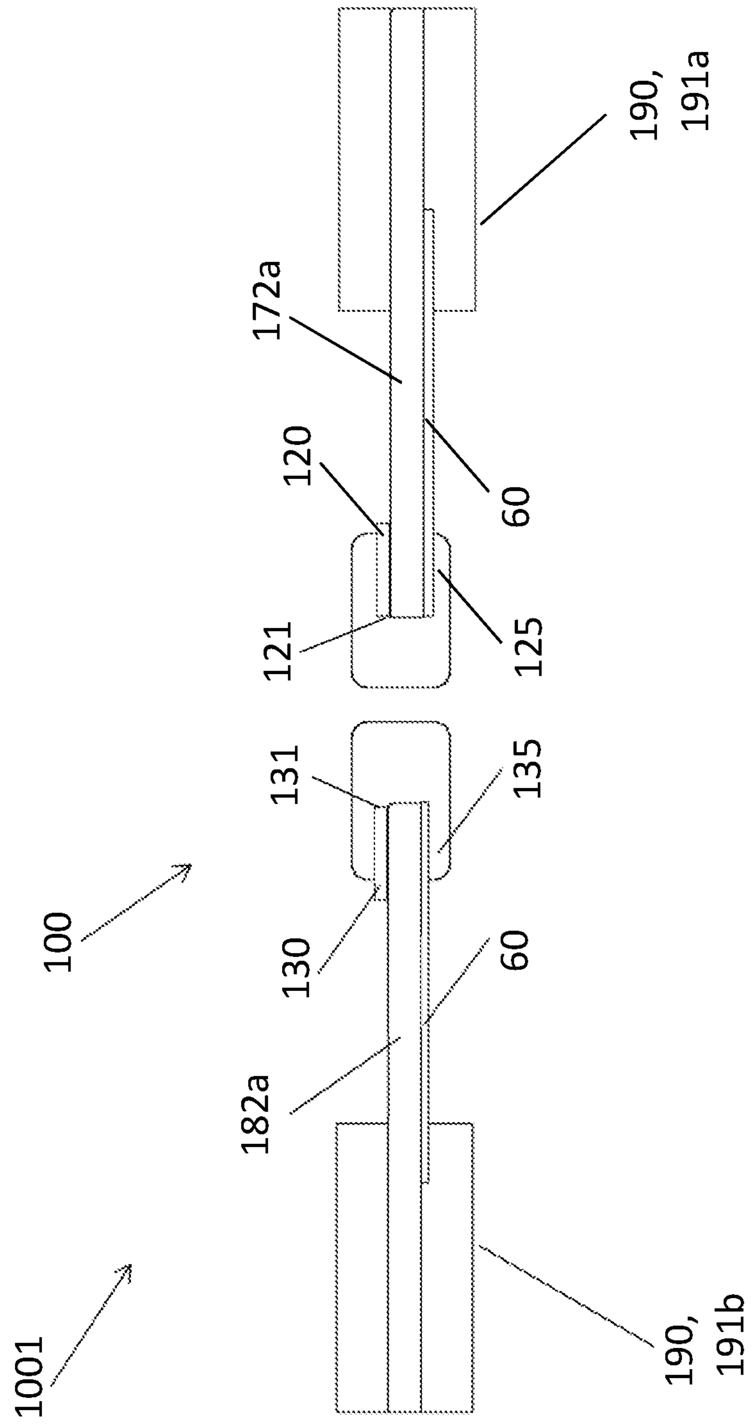
FIG. 1H shows a schematic side view of a rigid-flex PCB with the fastener arrangement, according to an aspect of the present disclosure.

As shown in FIG. 1G and FIG. 1H, each electronic board 171 and 181 may include a corresponding electrical interface 60 (e.g., narrow connector(s), gold finger(s) e.g., fine-pitched gold fingers having a pitch as small as 0.35 mm, etc.). In an aspect, when the first fastener tape 120 and the second fastener tape 130 are secured to a corresponding electronic board 171 or 181, the first plurality of electrically conductive coupling elements 125 may be capable of being or may be electrically connected (e.g., in direct contact, or indirect electrical communication e.g., via a solder line/bridge or via an electrical cable) to the electrical interface 60 of the first electronic board 171. Further, the second plurality of electrically conductive coupling elements 135 may be capable of being or may be electrically connected (e.g., in direct contact, or indirect electrical communication) to the electrical interface 60 of the second electronic board 181.

As shown in FIG. 1G, the first flexible cable 172 (e.g., a flexible flat cable) may include the electrical interface 60 (e.g., narrow connector(s), fine-pitched gold fingers(s), wires, etc.) on a first surface or side (e.g., bottom surface or side) of the first flexible cable 172. In an aspect, a hot-press process may bond the electrical interface 60 of the first flexible cable 172 onto the first electronic board 171 (e.g., a printed circuit board) with an anisotropic conductive material (ACM), anisotropic conductive film (ACF), etc., (ref 90 in FIG. 1G) sandwiched and adjoining the first flexible cable 172 and the first electronic board 171 at a first longitudinal end or end region of the first flexible cable 172. Accordingly, the ACM, ACF, etc., (i.e., ref 90) may serve as an electrical communication path or bridge between the first flexible cable 172 and the first electronic board 171. In an aspect, the first flexible cable 172 and the first electronic board 171 may together form a first FPC 1700.

Similarly, in an aspect, the second flexible cable 182 may and the second electronic board 181 may together form a second FPC 1800 in a similar or identical manner to how the first FPC 1700 may be formed.

The first fastener tape 120 may be disposed on and/or attached to an opposite second surface or side (e.g., top surface or side) of the first flexible cable 172, at an opposite second longitudinal end of the first flexible cable 172.

Further, the second fastener tape 130 may be disposed on and/or attached to an opposite second surface or side (e.g., top surface or side) of the second flexible cable 182, at an opposite second longitudinal end of the second flexible cable 182.

As shown, the first plurality of electrically conductive coupling elements 125 may be in contact or engagement with the first fastener tape 120 and the first flexible cable 172 (e.g., with the electrical interface 60 of the first flexible cable 172).

Further, the second plurality of electrically conductive coupling elements 135 may be in contact or engagement with the second fastener tape 130 and the second flexible cable 182 (e.g., with the electrical interface 60 of the second flexible cable 182).

As shown, each electrically conductive coupling element 125 and 135 of the first and the second pluralities of electrically conductive coupling elements 125 and 135 may include the jaw 80 as shown in FIG. 1D which may be adapted to clamp a corresponding fastener tape 120 or 130 with the electronic board 171 or 181. Specifically, a first side (e.g., first arm 81) of the jaw 80 of each electrically conductive coupling element 125 and 135 may be in contact with or connected to a corresponding fastener tape 120 or 130 (i.e., which may, in turn, be disposed on a surface of the electronic board 171 or 181). Further, a second side (e.g., second arm 81, e.g., opposing or opposite the first arm 81) of the jaw 80 may be in contact with or connected to an opposite surface of the electronic board 171 or 181 (e.g., to the electrical interface 60 on the opposite surface of the electronic board 171 or 181).

In an aspect, the first plurality of non-electrically conductive coupling elements 126 may be in contact or engagement with the first fastener tape 120 and the first flexible cable 172 (e.g., at a region of the first flexible cable 172 with or without the electrical interface 60).

The second plurality of non-electrically conductive coupling elements 136 may be in contact or engagement with the second fastener tape 130 and the second flexible cable 182 (e.g., at a surface region of the second flexible cable 182 with or without the electrical interface 60).

Similar to the electrically conductive coupling elements 125 and 135, each non-electrically conductive coupling element 126 and 136 of the first and the second pluralities of non-electrically conductive coupling elements 126 and 136 may include the jaw 80 as shown in FIG. 1D configured to clamp a corresponding fastener tape 120 or 130 with the electronic board 171 or 181.

In an aspect, an outer surface (e.g., entire outer surface) of each jaw 80 of each coupling element 125, 126, 135 and 136, when clamped to a corresponding fastener tape 120 or 130 with the electronic board 171 or 18, may be exposed (in other words, free or uninterrupted) across an outer surface thereof for the slider 160 to glide over.

According to an aspect of the present disclosure, the first paired coupling elements 127 may oppose and may be aligned (e.g., in staggered relation) with the second paired coupling elements 137 for interconnection (e.g., interleaving and interlocking) therewith, to electrically connect the first FPC 1700 (e.g., first electronic board 171 of the first FPC 1700) to the second FPC 1800 (e.g., second electronic board 181 of the first FPC 1700), by actuating (in other words, sliding or moving) the slider 160 over and along (i.e., lengthwise) the first and the second fastener tapes 120 and 130 which are respectively attached to the first and the second flexible cables 172 and 182 of the first and the second FPCs 1700 and 1800.

FIG. 1H shows a schematic side view of a Rigid-flex PCB 190 with the fastener arrangement 100, according to an aspect of the present disclosure.

With reference to FIG. 1H, in an aspect, the Rigid-flex PCB 190 (e.g., in lieu of the first board 171 with the first flexible cable 172 and the second board 181 with the second flexible cable 182 as shown in FIG. 1G) may be provided with the fastener arrangement 100 attached to a first flexible cable **172*a* and to a second flexible cable 182*a* of the Rigid-flex PCB 190. Accordingly, the fastener arrangement 100 may enable reversible connection (e.g., electrical connection) or coupling of the first flexible cable 172*a* with the second flexible cable 182*a* of the Rigid-flex PCB 190**.

The fastener arrangement 100 may be selectively attached or secured to any location (e.g., arbitrary location) along the first and the second flexible cables **172*a* and 182*a* of the Rigid-flex PCB 190. Accordingly, the Rigid-flex PCB 190 having the fastener arrangement 100, according to an aspect of the present disclosure, may provide a capability or an option (e.g. to a technician or manufacturer) of attaching/detaching a first board (e.g., sub-board) 191*a* of the Rigid-flex PCB 190 (which may be connected or affixed to the first flexible cable 172*a*) to/from a second board (e.g., main-board) 191*b* of the Rigid-flex PCB 190 (which may be connected or affixed to the second flexible cable 182*a*). In an aspect, the Rigid-flex PCB 190 having the fastener arrangement 100 may have an added advantage in that the Rigid-flex PCB 190** may be relatively thin (or short).

As described herein, in an aspect, the first plurality of electrically conductive coupling elements 125 may be in electrical communication (e.g., electrically coupled) with at least one electronic board(s), and the second plurality of electrically conductive coupling elements 135 may be in electrical communication with at least one other electronic board(s). Accordingly, when at least one conductive-bridge 141 is formed by interlocked and interleaved first paired coupling elements 127 and second paired coupling elements 137, the at least two electronic boards may be electrically coupled with each other. In other words, the at least two electronic boards may be capable of electrical communication with each other via the at least one conductive-bridge 141 formed therebetween.

In an aspect, the first fastener tape 120 and the first paired coupling elements 127, the second fastener tape 130 and the second paired coupling elements 137, the slider 160, and any of at least two electronic boards, as described herein, may together form a flexible printed circuit board arrangement 1001 (e.g., a reversibly separable circuit board).

Accordingly, the flexible printed circuit board arrangement 1001 may include the first fastener tape 120 including the first plurality of electrically conductive coupling elements 125 and the first plurality of non-electrically conductive coupling elements 126. The flexible printed circuit board arrangement 1001 may further include the second fastener tape 130 including the second plurality of electrically conductive coupling elements 135 and the second plurality of non-electrically conductive coupling elements 136. The flexible printed circuit board arrangement 1001 may further include the slider 160 couplable to the first fastener tape 120 and the second fastener tape 130 for reversibly interleaving and interlocking or configured to or which reversibly interleaves and interlocks the first plurality of electrically conductive and non-electrically conductive coupling elements 125 and 126 with their corresponding second plurality of electrically conductive and non-electrically conductive coupling elements 135 and 136. In an aspect, the interleaved and interlocked first and second plurality of electrically conductive coupling elements 125 and 135 may form the at least one or the plurality of conductive-bridge(s) 141. Further, in an aspect, the interleaved and interlocked first and second plurality of non-electrically conductive coupling elements 126 and 136 may form the at least one or the plurality of insulation-bridge(s) 142. The flexible printed circuit board arrangement 1001 may further include the first electronic board 171, 191*a* in electrical communication with the first plurality of electrically conductive coupling elements 125. The flexible printed circuit board arrangement 1001 may further include the second electronic board 181, 191*b* in electrical communication with the second plurality of electrically conductive coupling elements 135.

In an aspect, the flexible printed circuit board arrangement 1001 may further include any other one or more features and/or limitations of the fastener arrangement 100 as described herein (and/or of first variant fastener arrangement 100*a* and/or second variant fastener arrangement 100*b*, as described with reference to FIG. 2A to FIG. 3C below).

Figure 2A:
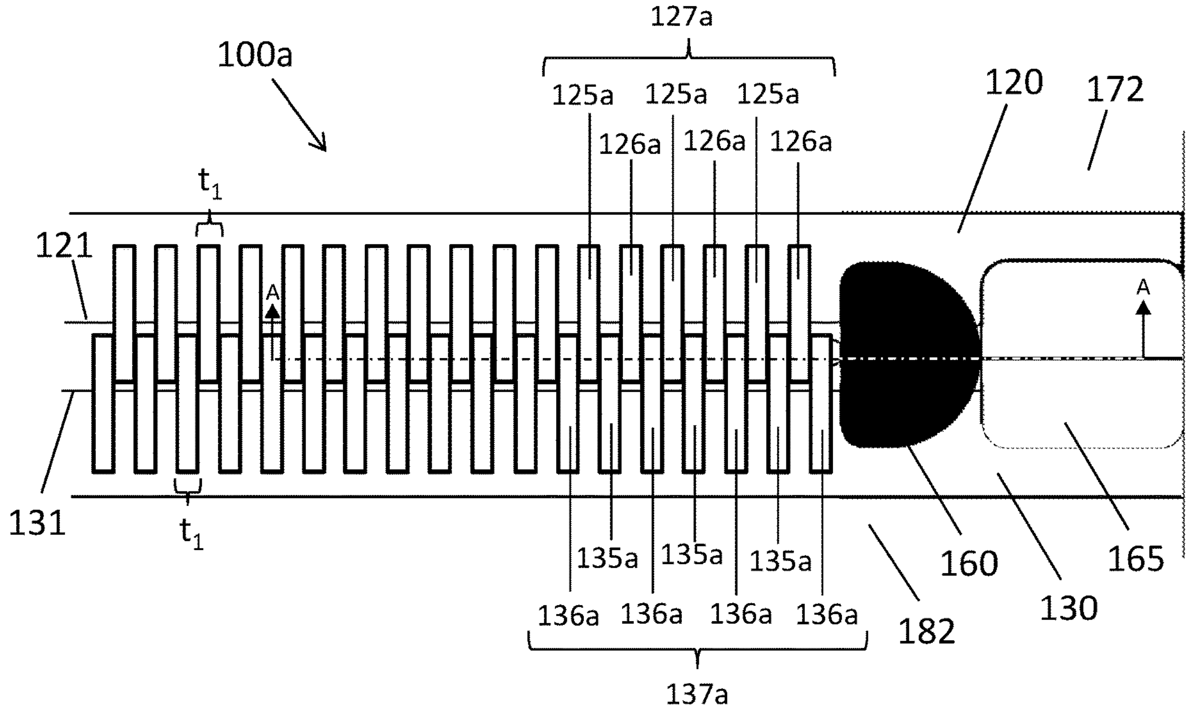
FIG. 2A shows a first variant fastener arrangement, according to an aspect of the present disclosure.
Figure 2B:
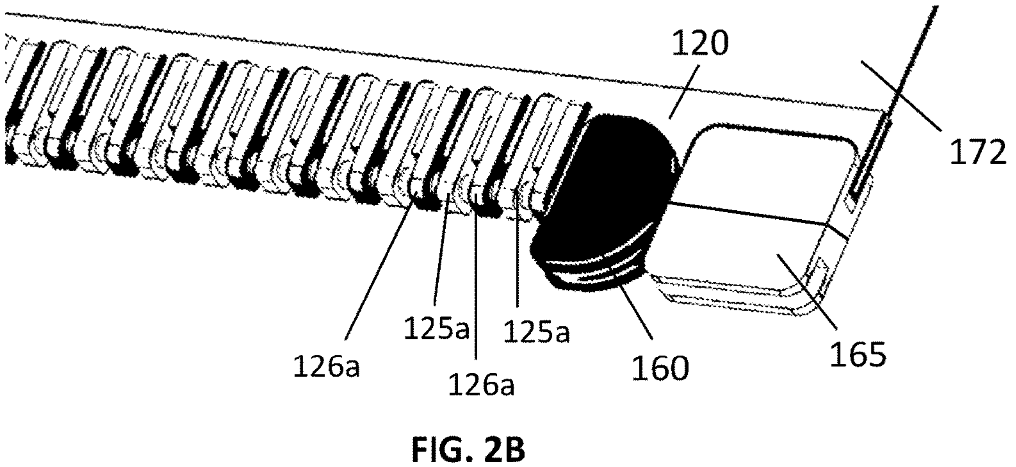
FIG. 2B shows, among other features, a perspective view of the first fastener tape, first paired coupling elements, the slider, and the end stop, of the first variant fastener arrangement of FIG. 2A, according to an aspect of the present disclosure.
Figure 2C:
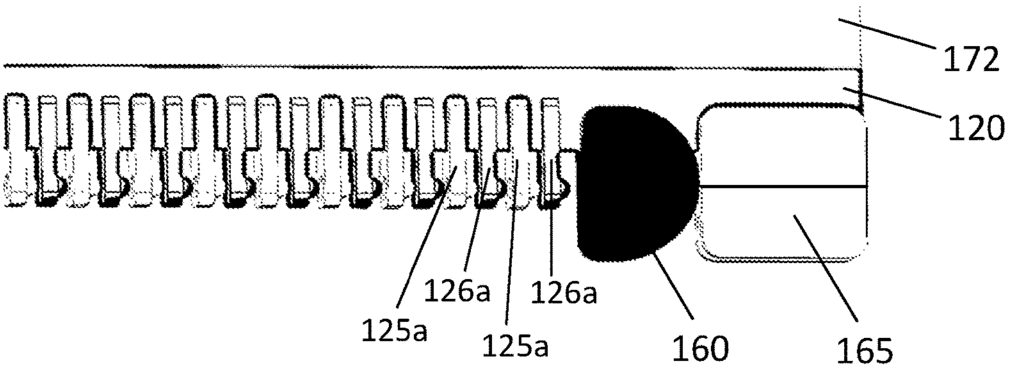
FIG. 2C shows a top view of FIG. 2B, according to an aspect of the present disclosure.
Figure 2D:
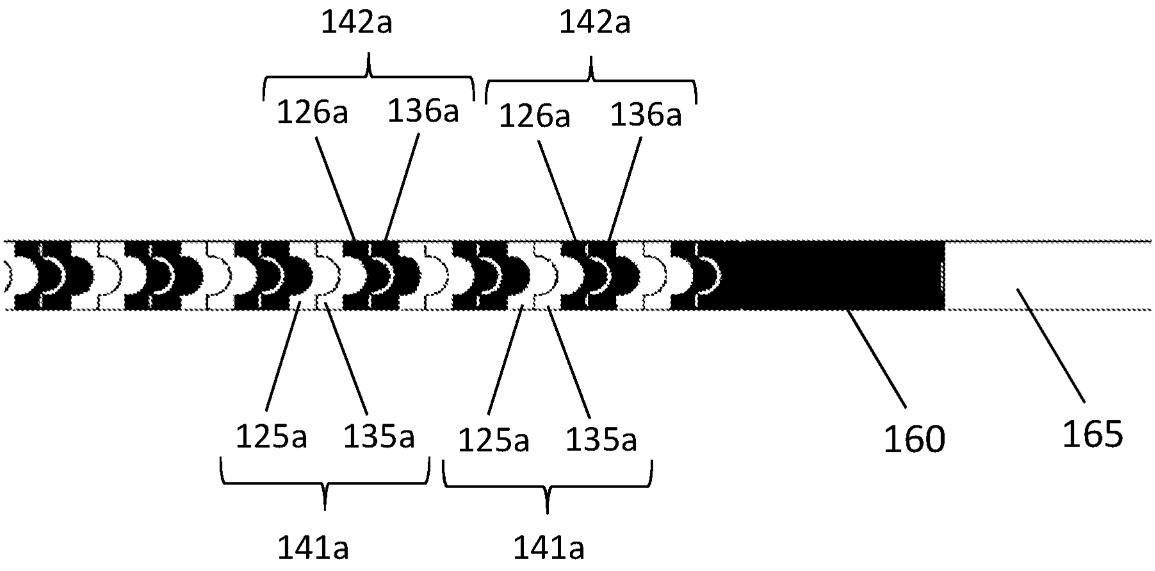
FIG. 2D shows a cross-sectional view along A-A of FIG. 2A, according to an aspect of the present disclosure.

FIG. 2A shows a first variant fastener arrangement 100*a*, according to an aspect of the present disclosure; FIG. 2B shows, among other features, a perspective view of the first fastener tape 120, first paired coupling elements 127*a*, the slider 160, and the end stop 165, of the first variant fastener arrangement 100*a* of FIG. 2A, according to an aspect of the present disclosure; FIG. 2C shows a top view of FIG. 2B, according to an aspect of the present disclosure; and FIG. 2D shows a cross-sectional view along A-A of FIG. 2A, according to an aspect of the present disclosure.

According to an aspect of the present disclosure, the first variant fastener arrangement 100*a* may contain any one or more of the features and/or limitations of the fastener arrangement 100 of FIG. 1A to FIG. 1H. In the following, the first variant fastener arrangement 100*a* is described with like reference characters generally referring to the same or corresponding parts/features of the fastener arrangement 100 of FIG. 1A to FIG. 1H. The description of the parts/features made with respect to the first variant fastener arrangement 100*a* may be applicable with respect to the fastener arrangement 100, and vice versa.

In an aspect, the first variant fastener arrangement 100*a* may include a first plurality of electrically conductive coupling elements 125*a* and a first plurality of non-electrically conductive coupling elements 126*a*, which may together form first paired coupling elements 127*a* of the first variant fastener arrangement 100. Further, the first variant fastener arrangement 100*a* may include a second plurality of electrically conductive coupling elements 135*a* and a second plurality of non-electrically conductive coupling elements 136*a*, which may together form second paired coupling elements 137*a* of the first variant fastener arrangement 100.

As shown, in an aspect, the first paired coupling elements 127*a* may be spaced apart or separated from one another or may be positioned at regular intervals along the longitudinal edge 121 of the first fastener tape 120. Further, as shown, the first plurality of electrically conductive coupling elements 125*a* and the first plurality of non-electrically conductive coupling elements 126*a* may be arranged in an alternating fashion (in other words, alternately arranged), lengthwise along the longitudinal edge 121 of the first fastener tape 120, such that each pair of neighbouring electrically conductive coupling elements 125*a* may be separated by one non-electrically conductive coupling element 126*a*. Similarly, in an aspect, the second paired coupling elements 137 may be spaced apart or separated from one another or may be positioned at regular intervals along the longitudinal edge 131 of the second fastener tape 130. Further, the second plurality of electrically conductive coupling elements 135*a* and the second plurality of non-electrically conductive coupling elements 136*a* may be arranged in an alternating fashion, lengthwise along the longitudinal edge 121 of the first fastener tape 120, such that each pair of neighbouring electrically conductive coupling elements 135*a* may be separated by one (e.g., only one) non-electrically conductive coupling element 136*a*.

Accordingly, when the first paired coupling elements 127*a* and the second paired coupling elements 137 are interleaved and interlocked with each other, the first variant fastener arrangement 100*a* may form or may include at least one conductive-bridge 141*a* and at least one insulation-bridge 142*a*. As shown in FIG. 2D, the at least one conductive-bridge 141*a* and at least one insulation-bridge 142*a* of the first variant fastener arrangement 100*a* may be arranged in an alternating fashion. In particular, a plurality of conductive-bridges 141*a* and a plurality of insulation-bridges 142*a* of the first variant fastener arrangement 100*a* may be positioned alternately with respect to each other such that each pair of neighbouring conductive-bridges 141*a* may be separated by one (e.g., only one) insulation-bridge 142*a*. Further, each pair of neighbouring insulation-bridges 142*a* may be separated by one (e.g., only one) conductive-bridge 141*a*.

Figure 3A:
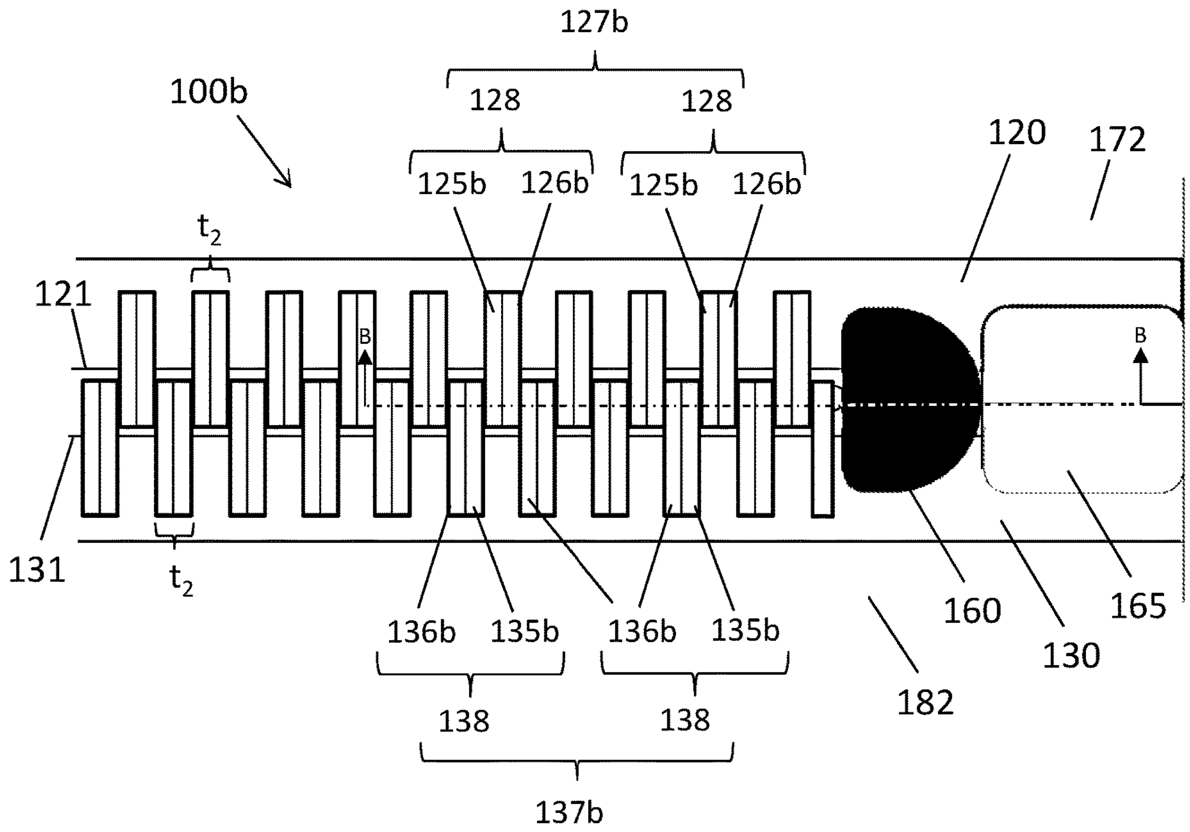
FIG. 3A shows a second variant fastener arrangement, according to an aspect of the present disclosure.
Figure 3B:
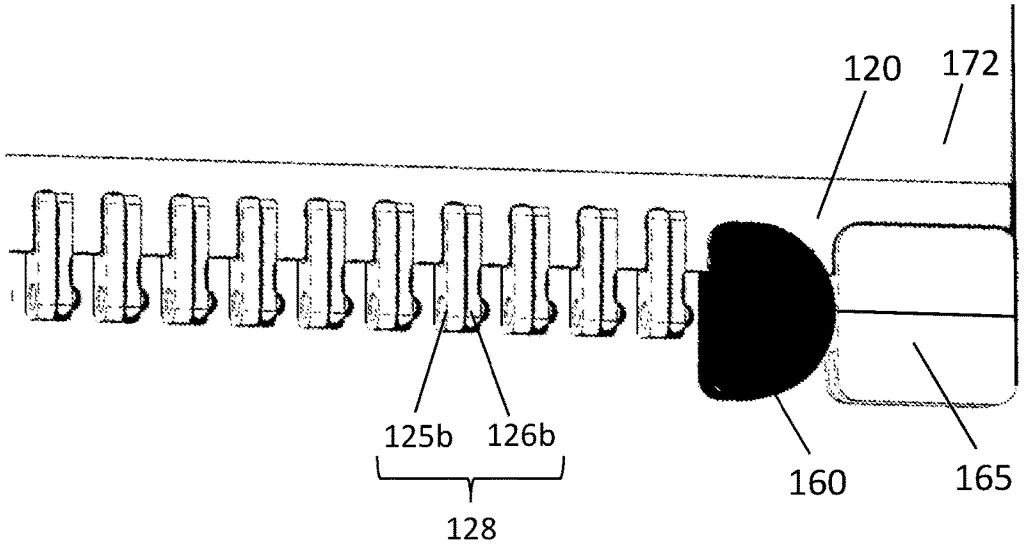
FIG. 3B shows, among other features, a perspective view of the first fastener tape, first paired coupling elements, the slider, and the end stop, of the second variant fastener arrangement of FIG. 3A, according to an aspect of the present disclosure.
Figure 3C:
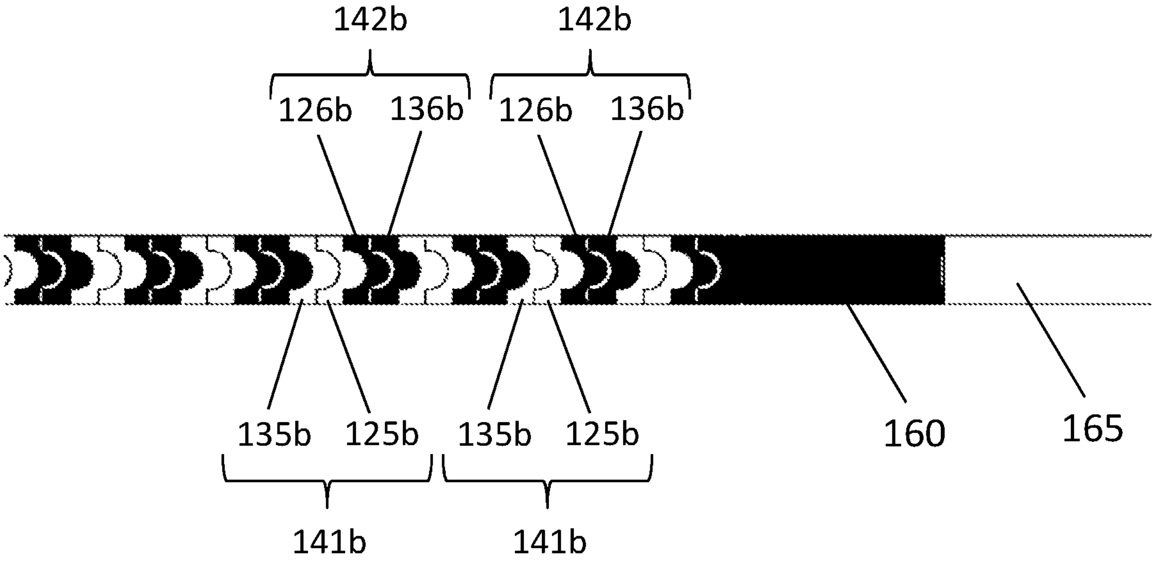
FIG. 3C shows a cross-sectional view along B-B of FIG. 3A, according to an aspect of the present disclosure.

FIG. 3A shows a second variant fastener arrangement 100*b*, according to an aspect of the present disclosure; FIG. 3B shows, among other features, a perspective view of the first fastener tape 120, first paired coupling elements 127*b*, the slider 160, and the end stop 165, of the second variant fastener arrangement 100*b* of FIG. 3A, according to an aspect of the present disclosure; and FIG. 3C shows a cross-sectional view along B-B of FIG. 3A, according to an aspect of the present disclosure.

According to an aspect of the present disclosure, the second variant fastener arrangement 100*b* may contain any or all the features and/or limitations of the fastener arrangement 100 of FIG. 1A to FIG. 1H. In the following, the second variant fastener arrangement 100*b* is described with like reference characters generally referring to the same or corresponding parts/features of the fastener arrangement 100 of FIG. 1A to FIG. 1H. The description of the parts/features made with respect to the second variant fastener arrangement 100*b* may be applicable with respect to the fastener arrangement 100, and vice versa.

In an aspect, the second variant fastener arrangement 100*b* may include a first plurality of electrically conductive coupling elements 125*b* and a first plurality of non-electrically conductive coupling elements 126*b*, which may together form first paired coupling elements 127*b* of the second variant fastener arrangement 100*b*. Further, the second variant fastener arrangement 100*b* may include a second plurality of electrically conductive coupling elements 135*b* and a second plurality of non-electrically conductive coupling elements 136*b*, which may together form second paired coupling elements 137*b* of the second variant fastener arrangement 100*b*.

In an aspect, along the longitudinal edge 121 of the first fastener tape 120 of the second variant fastener arrangement 100*b*, each of the first plurality of electrically conductive coupling elements 125*b* may be in engagement (e.g., mating engagement) or contact with or affixed to a respective one or at least one of the first plurality of non-electrically conductive coupling elements 126*b* (e.g., at a corresponding first side e.g., upward-facing side, or downward-facing side, of the electrically conductive coupling element 125*b*) to form a respective first composite-coupling-element 128 (e.g., a hybrid pin). As an example, each first composite-coupling-element 128 may be formed of or may include one electrically conductive coupling element 125*b* and one non-electrically conductive coupling element 126*b*. As another example, each first composite-coupling-element 128 may be formed of one electrically conductive coupling element 125*b* and two non-electrically conductive coupling elements 126*b* on one side of the electrically conductive coupling element 125*b*. As yet another example, each first composite-coupling-element 128 may be formed a plurality of electrically conductive coupling elements 125*b* and a plurality of non-electrically conductive coupling elements 126*b* in any order so long as one side (or end) of the composite-coupling-element 128 has an electrically conductive coupling element 125*b* (or electrically conductive surface) and another opposite side (or end) of the composite-coupling-element 128 has a non-electrically conductive coupling element 126*b* (or non-electrically conductive surface).

As shown, the second variant fastener arrangement 100*b* may include a plurality of first composite-coupling-elements 128 spaced apart or separate from one another or may be positioned at regular intervals along the longitudinal edge 121 of the first fastener tape 120 of the second variant fastener arrangement 100*b*. The interval may be equal (e.g., substantially equal) to a thickness (or width) of one second composite-coupling-element 138 as described below.

In an aspect, along the longitudinal edge 131 of the second fastener tape 130 of the second variant fastener arrangement 100*b*, each of the second plurality of electrically conductive coupling elements 135*b* may be in engagement (e.g., mating engagement) or contact with or affixed to a respective one or at least one of the second plurality of non-electrically conductive coupling elements 136*b* (e.g., at a corresponding second side e.g., downward-facing side, or upward-facing side, opposite to the first side of the first plurality of electrically conductive coupling elements 125*b* of the electrically conductive coupling element 135*a*) to form a respective second composite-coupling-element 138. As an example, each first composite-coupling-element 138 may be formed of one electrically conductive coupling element 135*b* and one non-electrically conductive coupling element 136*b*. As another example, each first composite-coupling-element 138 may be formed of one electrically conductive coupling element 135*b* and two non-electrically conductive coupling elements 136*b* on one side of the electrically conductive coupling elements 135*b*. As yet another example, each first composite-coupling-element 138 may be formed a plurality of electrically conductive coupling elements 135*b* and a plurality of non-electrically conductive coupling elements 136*b* in any order as long as one side (or end) of the composite-coupling-element 138 has one electrically conductive coupling element 135*b* and another opposite side (or end) of the composite-coupling-element 138 has one non-electrically conductive coupling element 136*b*.

As shown, the second variant fastener arrangement 100*b* may include a plurality of second composite-coupling-elements 138 spaced apart or separate from one another or may be positioned at regular intervals along the longitudinal edge 131 of the second fastener tape 130 of the second variant fastener arrangement 100*b*. The interval may be equal (e.g., substantially equal) to a thickness (or width) of one first composite-coupling-element 128.

As an example, according to an aspect of the present disclosure, each of the first composite-coupling-element 128 and the second composite-coupling-element 138 may be formed by hard anodizing one surface or side of an electrically conductive coupling element 125*b* and 135*b*, or may be formed by multi-shot (e.g., double-shot) molding (e.g., injection molding), etc., or any other suitable process.

With reference to FIG. 2A and FIG. 3A, according to an aspect of the present disclosure, a total thickness of each composite-coupling-element 128 and 138 of the second variant fastener arrangement 100*b* may be thinner or smaller than a total or combined thickness of one electrically conductive coupling element 125*a* or 135*a* and one non-electrically conductive element 126*a* or 136*a* of the first variant fastener arrangement 100*a* (i.e., $t_2<(2*t_1)$). Accordingly, the second variant fastener arrangement 100*b* may be configured to form or may include a larger number of conductive-bridges 141*b* and/or insulation bridges 142*b* than the first variant fastener arrangement 100*a*. Thus, the second variant fastener arrangement 100*b* may be utilized for massive or large Input/Output signal transfer (which may be less or non-sensitive to noise e.g., cross-talk).

On the other hand, a distance between each pair of neighbouring conductive-bridges 141*a* of the first variant fastener arrangement 100*a* may be wider than a distance between each pair of neighbouring conductive-bridges 141*b* of the second variant fastener arrangement 100*b*. Thus, the first variant fastener arrangement 100*a* may be utilized for high-speed or noise-sensitive signal transfer (since each pair of neighbouring conductive-bridges 141*a* of the first variant fastener arrangement 100*a* may be further apart). According to an aspect of the present disclosure, for high-speed signal transfers, the first and the second fastener tapes 120 and 130 (e.g., non-electrically conductive tapes) may serve as a ground between high-speed signals passing through corresponding conductive-bridges 141 or 141*a* or 141*b* (e.g., pins) of the fastener arrangement 100 or 100*a* or 100*b*. In another aspect, any suitable type of grounding may be employed for a similar purpose.

Figure 4:
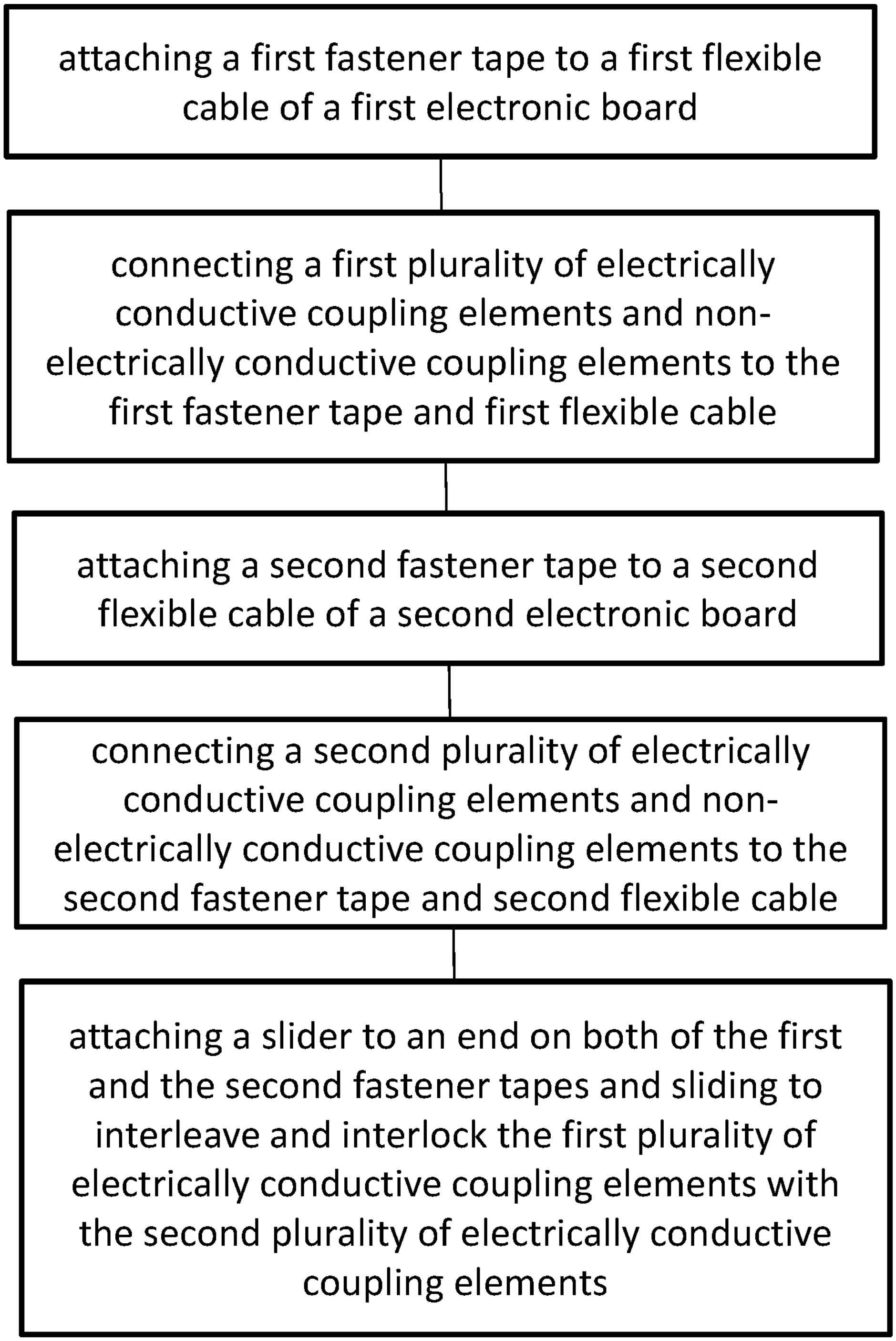
FIG. 4 shows a flowchart for a method of assembling the flexible printed circuit board arrangement, according to an aspect of the present disclosure.

FIG. 4 shows a flowchart depicting a method of assembling the flexible printed circuit board arrangement 1001, according to an aspect of the present disclosure.

The method is not limited to being carried out in the order depicted in FIG. 4, and may be carried out in any suitable order.

In an aspect, the method may include attaching or securing the first fastener tape 120 to the first electronic board 171 or 191*a* (or circuit board). In particular, the first fastener tape 120 may be attached (e.g., using an adhesive, a magnetic attachment, a mechanical fastener, etc.) to only one surface (e.g., either a top surface or an opposite bottom surface) of the first electronic board 171 or 191*a* (e.g., to a flexible cable 172, 172*a* of the electronic board 171 or 191*a*).

The method may further include securing or connecting the first plurality of electrically conductive coupling elements 125 and the first plurality of non-electrically conductive coupling elements 126 to the first fastener tape 120 and to the first electronic board 171 or 191*a* (e.g., the flexible cable 172, 172*a* of the electronic board 171 or 191*a*).

In one example, securing or connecting the first plurality of electrically conductive coupling elements 125 and the first plurality of non-electrically conductive coupling elements 126 to the first fastener tape 120 and to the first electronic board 171 or 191*a* may involve using the jaw 80 of each of the first plurality of electrically conductive coupling elements 125 and the first plurality of non-electrically conductive coupling elements 126 to clamp the first fastener tape 120 and the first electronic board 171 or 191*a* (e.g., the flexible cable 172, 172*a* of the electronic board 171 or 191*a*), such that the first plurality of electrically conductive coupling elements 125 are in connection or contact with the first fastener tape 120 and with the flexible cable 172, 172*a* (e.g., an electrical interface 60 of the flexible cable 172, 172*a*) of the first electronic board 171 or 191*a* and the first plurality of non-electrically conductive coupling elements 126 are in connection or contact with the first fastener tape 120 and with the flexible cable 172, 172*a*.

In another example, the first plurality of non-electrically conductive coupling elements 126 may be integrally molded (e.g., injection-molded) or integrally printed (e.g., additive printing) with the first fastener tape 120, while only the first plurality of electrically conductive coupling elements 125 may include the jaw 80 for clamping onto spaces on the first fastener tape 120 between the first plurality of non-electrically conductive coupling elements 126.

The method may further include attaching or securing the second fastener tape 130 to the second electronic board 181 or 191*b* (or circuit board). In particular, the second fastener tape 130 may be attached (e.g., using an adhesive, a magnetic attachment, a mechanical fastener, etc.) to only one surface (e.g., either a top surface or an opposite bottom surface) of the second electronic board 181 or 191*b* (e.g., to a flexible cable 182, 182*a* of the electronic board 181 or 191*b*).

The method may further include securing or connecting the second plurality of electrically conductive coupling elements 135 and the second plurality of non-electrically conductive coupling elements 136 to the second fastener tape 130 and the second electronic board 181 or 191*b* (e.g., the flexible cable 182, 182*a* of the electronic board 181 or 191*b*), for example, in a similar or identical manner as the first plurality of electrically conductive coupling elements 125 and the first plurality of non-electrically conductive coupling elements 126 to the first fastener tape 120 and to the first electronic board 171 or 191*a*.

In an aspect, the method may further include soldering the first plurality of electrically conductive coupling elements 125 to the electrical interface 60 of the first electronic board 171 or 191*a*. Additionally or alternatively, the method may include soldering the second plurality of electrically conductive coupling elements 135 to the electrical interface 60 of the second electronic board 181 or 191*b*.

In an aspect, the method may further include attaching the slider 160 to an end (e.g., longitudinal end) on both of the first and the second fastener tapes 120 and 130. The method may further include actuating (e.g., sliding) the slider 160 along the first and the second fastener tapes 120 and 130 to reversibly interleave and interlock the first plurality of electrically conductive and non-electrically conductive coupling elements 125 and 126 with their corresponding second plurality of electrically conductive and non-electrically conductive coupling elements 135 and 136. In an aspect, the interleaved and interlocked first and second plurality of electrically conductive coupling elements 125 and 135 may form the at least one conductive-bridge(s) 141. Further, in an aspect, the interleaved and interlocked first and second plurality of non-electrically conductive coupling elements 126 and 136 may form the at least one insulation-bridge(s) 142.

In an aspect, the method may further include attaching the extension member 161 to the slider 160 for serving as an extension arm for actuating the slider 160.

In an aspect, the method may further include attaching the first and the second end stops 164 and 165 to the first and the second fastener tapes 120 and 130, respectively, for restricting a range of movement of the slider 160 between the end stops 164 and 165.

Various aspects as described may provide a fastener arrangement, a flexible printed circuit board arrangement, and a method of assembling the flexible printed circuit board arrangement, for reversibly coupling at least two boards (e.g., electronic boards) together.

According to various aspects, the fastener arrangement may be positioned at various locations within a system (e.g., computer system) to provide easy access (e.g., to a technician) thereto.

Various aspects may also provide a fastener arrangement which may be capable for forming a strong and reliable connection or joint between the at least two boards.

Various aspects may also provide the flexible printed circuit board arrangement which may be simple and generally low-cost to assemble and manufacture.

Examples

Example 1 provides a fastener arrangement which including a first fastener tape including a first plurality of electrically conductive coupling elements and a first plurality of non-electrically conductive coupling elements, a second fastener tape including a second plurality of electrically conductive coupling elements and a second plurality of non-electrically conductive coupling elements, and a slider couplable to the first fastener tape and the second fastener tape for reversibly interleaving and interlocking the first plurality of electrically conductive and non-electrically conductive coupling elements with their corresponding second plurality of electrically conductive and non-electrically conductive elements, for which the interleaved and interlocked first and second plurality of electrically conductive coupling elements form a plurality of conductive-bridges and the interleaved and interlocked first and second plurality of non-electrically conductive coupling elements form a plurality of insulation-bridges.

Example 2 may include the fastener arrangement of example 1 and/or any other example disclosed herein, for which the interleaved and interlocked first and second plurality of electrically conductive coupling elements and the interleaved and interlocked first and second plurality of non-electrically conductive coupling elements form an alternating arrangement of conductive-bridges and insulation-bridges.

Example 3 may include the fastener arrangement of example 2 and/or any other example disclosed herein, for which at least two neighbouring insulation-bridges are in contact with each other.

Example 4 may include the fastener arrangement of example 2 and/or any other example disclosed herein, for which the conductive-bridges are separated by at least one insulation-branch.

Example 5 may include the fastener arrangement of example 1 and/or any other example disclosed herein, for which the first plurality of electrically conductive coupling elements and the first plurality of non-electrically conductive coupling elements are positioned at regular intervals along a corresponding longitudinal edge of the first fastener tape, and for which the second plurality of electrically conductive coupling elements and the second plurality of non-electrically conductive coupling elements are positioned at regular intervals along a corresponding longitudinal edge of the second fastener tape.

Example 6 may include the fastener arrangement of example 1 and/or any other example disclosed herein, for which, along a corresponding longitudinal edge of the first fastener tape, each of the first plurality of electrically conductive coupling elements is engaged with at least one of the first plurality of non-electrically conductive coupling elements to form a first composite-coupling-element, a plurality of first composite-coupling-elements formed being positioned at regular intervals along the corresponding longitudinal edge of the first fastener tape, and for which, along a corresponding longitudinal edge of the second fastener tape, each of the second plurality of electrically conductive coupling elements is engaged with at least one of the second plurality of non-electrically conductive coupling elements to form a second composite-coupling-element, a plurality of second composite-coupling-elements formed being positioned at regular intervals along the corresponding longitudinal edge of the second fastener tape.

Example 7 may include the fastener arrangement of example 1 and/or any other example disclosed herein, for which each of the first fastener tape and the second fastener tape further includes a securing element for securing the fastener tape to a respective flexible cable.

Example 8 may include the fastener arrangement of example 7 and/or any other example disclosed herein, for which the securing element includes an adhesive.

Example 9 may include the fastener arrangement of example 1 and/or any other example disclosed herein, for which each coupling element of the first plurality of electrically conductive coupling elements and the first plurality of non-electrically conductive coupling elements includes a jaw for clamping the first fastener tape and a flexible cable attached to the first fastener tape, and for which each coupling element of the second plurality of electrically conductive coupling elements and the second plurality of non-electrically conductive coupling elements includes a jaw for clamping the second fastener tape and a flexible cable attached to the second fastener tape.

Example 10 may include the fastener arrangement of example 1 and/or any other example disclosed herein, further including at least two electronic boards electrically coupled to each other via at least one conductive-bridge formed when the first plurality of electrically conductive coupling elements and the second plurality of electrically conductive coupling elements are interleaved and interlocked with each other.

Example 11 may include the fastener arrangement of example 1 and/or any other example disclosed herein, further including an extension member configured to be detachably attached to the slider.

Example 12 provides a flexible printed circuit board arrangement including a first circuit board connected to a first fastener tape including a first plurality of electrically conductive coupling elements and a first plurality of non-electrically conductive coupling elements, a second circuit board connected to a second fastener tape including a second plurality of electrically conductive coupling elements and a second plurality of non-electrically conductive coupling elements, and a slider couplable to the first fastener tape and the second fastener tape for reversibly interleaving and interlocking the first plurality of electrically conductive and non-electrically conductive coupling elements with their corresponding second plurality of electrically conductive and non-electrically conductive elements, for which the interleaved and interlocked first and second plurality of electrically conductive coupling elements form a plurality of conductive-bridges that electrically couple the first and second circuit boards.

Example 13 may include the flexible printed circuit board arrangement of example 12 and/or any other example disclosed herein, for which each of the first circuit board and the second circuit board includes a respective flexible printed circuit board or a respective rigid-flex printed circuit board.

Example 14 may include the flexible printed circuit board arrangement of example 12 and/or any other example disclosed herein, for which each of the first circuit board and the second circuit board includes a respective electrical interface, the electrical interface of the first circuit board being electrically connected to at least one electrically conductive coupling element of the first fastener tape and the electrical interface of the second circuit board being electrically connected to at least one electrically conductive coupling element of the second fastener tape.

Example 15 may include the flexible printed circuit board arrangement of example 14 and/or any other example disclosed herein, for which each electrical interface of the first and second fastener tapes include at least one gold finger or at least one narrow connector.

Example 16 provides a method of assembling a flexible printed circuit board arrangement including attaching a first fastener tape to a first flexible cable of a first electronic board, connecting a first plurality of electrically conductive coupling elements and non-electrically conductive coupling elements to the first fastener tape and to the first flexible cable, attaching a second fastener tape to a second flexible cable of a second electronic board, connecting a second plurality of electrically conductive coupling elements and non-electrically conductive coupling elements to the second fastener tape and to the second flexible cable, and attaching a slider to a longitudinal end on both of the first and the second fastener tapes and sliding the slider to reversibly interleave and interlock the first plurality of electrically conductive coupling elements with the second plurality of electrically conductive coupling elements.

Example 17 may include the method of example 16 and/or any other example disclosed herein, for which connecting the first plurality of electrically conductive coupling elements and the first plurality of non-electrically conductive coupling elements to the first fastener tape and to the first flexible cable is such that at least the first plurality of electrically conductive coupling elements are in contact with the first fastener tape and with the first flexible cable, and for which connecting the second plurality of electrically conductive coupling elements and the second plurality of non-electrically conductive coupling elements to the second fastener tape and to the second flexible cable is such that at least the second plurality of electrically conductive coupling elements are in contact with the second fastener tape and with the second flexible cable.

Example 18 may include the method of example 16 and/or any other example disclosed herein, further including soldering the first plurality of electrically conductive coupling elements to a first electrical interface of the first electronic board, and soldering the second plurality of electrically conductive coupling elements to a second electrical interface of the second electronic board.

Example 19 may include the method of example 16 and/or any other example disclosed herein, further including attaching an extension member to the slider for sliding the slider.

Example 20 may include the method of example 16 and/or any other example disclosed herein, further including using a first securing element to secure the first fastener tape to the first flexible cable, and using a second securing element to secure the second fastener tape to the second flexible cable.

While the disclosure has been particularly shown and described with reference to specific aspects, it should be understood by those skilled in the art that various changes, modification, variation in form and detail may be made therein without departing from the scope of the present disclosure as defined by the appended claims. The scope of the present disclosure is thus indicated by the appended claims and all changes which come within the meaning and range of equivalency of the claims are therefore intended to be embraced.

What is claimed is:

1. A fastener arrangement comprising:

a first circuit board including a first flexible cable, a first end of the first flexible cable disposed within the first circuit board;

a second circuit board including a second flexible cable, a first end of the second flexible cable disposed within the second circuit board;

a first fastener tape comprising a first plurality of electrically conductive coupling elements and a first plurality of non-electrically conductive coupling elements coupled to a second end of the first flexible cable;

a second fastener tape comprising a second plurality of electrically conductive coupling elements and a second plurality of non-electrically conductive coupling elements coupled to a second end of the second flexible cable;

at least one first electrical interface disposed on the first flexible cable, a first end of the at least one first electrical interface disposed within the first circuit board and a second end of the at least one first electrical interface surrounded by one of the first plurality of electrically conductive coupling elements;

at least one second electrical interface disposed on the second flexible cable, a first end of the at least one second electrical interface disposed within the second circuit board and a second end of the at least one second electrical interface surrounded by one of the second plurality of electrically conductive coupling elements; and a slider couplable to the first fastener tape and the second fastener tape for reversibly interleaving and interlocking the first plurality of electrically conductive and non-electrically conductive coupling elements with their corresponding second plurality of electrically conductive and non-electrically conductive elements;

wherein the interleaved and interlocked first and second plurality of electrically conductive coupling elements form a plurality of conductive-bridges and the interleaved and interlocked first and second plurality of non-electrically conductive coupling elements form a plurality of insulation-bridges.

2. The fastener arrangement of claim 1, wherein the interleaved and interlocked first and second plurality of electrically conductive coupling elements and the interleaved and interlocked first and second plurality of non-electrically conductive coupling elements form an alternating arrangement of conductive-bridges and insulation- bridges.

3. The fastener arrangement of claim 2, wherein at least two neighbouring insulation-bridges are in contact with each other.

4. The fastener arrangement of claim 2, wherein the conductive-bridges are separated by at least one insulation-branch.

5. The fastener arrangement of claim 1, wherein the first plurality of electrically conductive coupling elements and the first plurality of non-electrically conductive coupling elements are positioned at regular intervals along a corresponding longitudinal edge of the first fastener tape, and wherein the second plurality of electrically conductive coupling elements and the second plurality of non-electrically conductive coupling elements are positioned at regular intervals along a corresponding longitudinal edge of the second fastener tape.

6. The fastener arrangement of claim 1, wherein, along a corresponding longitudinal edge of the first fastener tape, each of the first plurality of electrically conductive coupling elements is engaged with at least one of the first plurality of non-electrically conductive coupling elements to form a first composite-coupling-element, a plurality of first composite-coupling-elements formed being positioned at regular intervals along the corresponding longitudinal edge of the first fastener tape; and wherein, along a corresponding longitudinal edge of the second fastener tape, each of the second plurality of electrically conductive coupling elements is engaged with at least one of the second plurality of non-electrically conductive coupling elements to form a second composite-coupling-element, a plurality of second composite-coupling-elements formed being positioned at regular intervals along the corresponding longitudinal edge of the second fastener tape.

7. The fastener arrangement of claim 1, wherein each of the first fastener tape and the second fastener tape further comprises a securing element for securing the fastener tape to a respective flexible cable.

8. The fastener arrangement of claim 7, wherein the securing element comprises an adhesive.

9. The fastener arrangement of claim 1, wherein each coupling element of the first plurality of electrically conductive coupling elements and the first plurality of non-electrically conductive coupling elements comprises a jaw for clamping the first fastener tape and a flexible cable attached to the first fastener tape, wherein each coupling element of the second plurality of electrically conductive coupling elements and the second plurality of non-electrically conductive coupling elements comprises a jaw for clamping the second fastener tape and a flexible cable attached to the second fastener tape.

10. The fastener arrangement of claim 1, further comprising:

the first circuit board and the second circuit board electrically coupled to each other via at least one conductive-bridge formed when the first plurality of electrically conductive coupling elements and the second plurality of electrically conductive coupling elements are interleaved and interlocked with each other.

11. The fastener arrangement of claim 1, further comprising:

an extension member configured to be detachably attached to the slider.

12. A flexible printed circuit board arrangement comprising:

a first circuit board including a first flexible cable, a first end of the first flexible cable disposed within the first circuit board, a second end of the first flexible cable connected to a first fastener tape comprising a first plurality of electrically conductive coupling elements and a first plurality of non-electrically conductive coupling elements;

a second circuit board including a second flexible cable, a first end of the second flexible cable disposed within the second circuit board, a second end of the second flexible cable connected to a second fastener tape comprising a second plurality of electrically conductive coupling elements and a second plurality of non-electrically conductive coupling elements;

at least one first electrical interface disposed on the first flexible cable, a first end of the at least one first electrical interface disposed within the first circuit board and a second end of the at least one first electrical interface surrounded by one of the first plurality of electrically conductive coupling elements;

at least one second electrical interface disposed on the second flexible cable, a first end of the at least one second electrical interface disposed within the second circuit board and a second end of the at least one second electrical interface surrounded by one of the second plurality of electrically conductive coupling elements; and a slider couplable to the first fastener tape and the second fastener tape for reversibly interleaving and interlocking the first plurality of electrically conductive and non-electrically conductive coupling elements with their corresponding second plurality of electrically conductive and non-electrically conductive elements, wherein the interleaved and interlocked first and second plurality of electrically conductive coupling elements form a plurality of conductive-bridges that electrically couple the first and second circuit boards.

13. The flexible printed circuit board arrangement of claim 12, wherein each of the first circuit board and the second circuit board comprises a respective flexible printed circuit board or a respective rigid-flex printed circuit board.

14. The flexible printed circuit board arrangement of claim 12, wherein the at least one first electrical interface of the first circuit board being electrically connected to at least one electrically conductive coupling element of the first fastener tape and the at least one second electrical interface of the second circuit board being electrically connected to at least one electrically conductive coupling element of the second fastener tape.

15. The flexible printed circuit board arrangement of claim 14, wherein each of the at least one first electrical interface and the at least one second electrical interface comprises at least one gold finger.

16. A method of assembling a flexible printed circuit board arrangement comprising:

attaching a first fastener tape to a first flexible cable of a first electronic board, a first end of the first flexible cable disposed within the first electronic board;

connecting a first plurality of electrically conductive coupling elements and non-electrically conductive coupling elements to the first fastener tape and to a second end of the first flexible cable;

attaching a second fastener tape to a second flexible cable of a second electronic board, a first end of the second flexible cable disposed within the second electronic board;

connecting a second plurality of electrically conductive coupling elements and non-electrically conductive coupling elements to the second fastener tape and to a second end of the second flexible cable;

at least one first electrical interface disposed on the first flexible cable, a first end of the at least one first electrical interface disposed within the first circuit board and a second end of the at least one first electrical interface surrounded by one of the first plurality of electrically conductive coupling elements;

at least one second electrical interface disposed on the second flexible cable, a first end of the at least one second electrical interface disposed within the second circuit board and a second end of the at least one second electrical interface surrounded by one of the second plurality of electrically conductive coupling elements; and attaching a slider to a longitudinal end on both of the first and the second fastener tapes and sliding the slider to reversibly interleave and interlock the first plurality of electrically conductive coupling elements with the second plurality of electrically conductive coupling elements.

17. The method of claim 16, wherein connecting the first plurality of electrically conductive coupling elements and the first plurality of non-electrically conductive coupling elements to the first fastener tape and to the first flexible cable is such that at least the first plurality of electrically conductive coupling elements are in contact with the first fastener tape and with the first flexible cable, and wherein connecting the second plurality of electrically conductive coupling elements and the second plurality of non-electrically conductive coupling elements to the second fastener tape and to the second flexible cable is such that at least the second plurality of electrically conductive coupling elements are in contact with the second fastener tape and with the second flexible cable.

18. The method of claim 16, further comprising:

soldering the first plurality of electrically conductive coupling elements to a first electrical interface of the first electronic board; and soldering the second plurality of electrically conductive coupling elements to a second electrical interface of the second electronic board.

19. The method of claim 16, further comprising attaching an extension member to the slider for sliding the slider.

20. The method of claim 16, further comprising using a first securing element to secure the first fastener tape to the first flexible cable; and using a second securing element to secure the second fastener tape to the second flexible cable.

* * * * *